(12) United States Patent
Miller

(10) Patent No.: US 9,540,050 B2
(45) Date of Patent: Jan. 10, 2017

(54) STOWABLE TRUCK BED COVER AND HEIGHT EXTENDER

(71) Applicant: RESSB, LLC, San Tan Valley, AZ (US)

(72) Inventor: Richard A Miller, San Tan Valley, AZ (US)

(73) Assignee: RESSB, LLC, San Tan Valley, AZ (US)

( * ) Notice: Subject to any disclaimer, the term of this patent is extended or adjusted under 35 U.S.C. 154(b) by 78 days.

(21) Appl. No.: 14/413,135

(22) PCT Filed: Jul. 5, 2013

(86) PCT No.: PCT/US2013/049450
§ 371 (c)(1),
(2) Date: Apr. 14, 2015

(87) PCT Pub. No.: WO2014/008473
PCT Pub. Date: Jan. 9, 2014

(65) Prior Publication Data
US 2015/0232133 A1    Aug. 20, 2015

Related U.S. Application Data

(60) Provisional application No. 61/717,059, filed on Oct. 22, 2012, provisional application No. 61/668,917, filed on Jul. 6, 2012.

(51) Int. Cl.
*B62D 33/03* (2006.01)
*B62D 33/04* (2006.01)
(Continued)

(52) U.S. Cl.
CPC .......... *B62D 33/03* (2013.01); *B60P 7/02* (2013.01); *B62D 33/046* (2013.01); *B62D 33/077* (2013.01); *B60J 7/141* (2013.01)

(58) Field of Classification Search
CPC ............ B60J 7/141; B60J 7/1621; B60P 1/26; B60P 1/64; B60P 3/00; B60P 3/32; B60P 3/341; B60P 7/02; B62D 33/03; B62D 33/046; B62D 33/077
See application file for complete search history.

(56) References Cited

U.S. PATENT DOCUMENTS

| 3,680,908 A * | 8/1972 | Bowen | B60P 3/341 |
| | | | 296/170 |
| 3,768,858 A * | 10/1973 | Boismier | B60J 7/041 |
| | | | 296/10 |

(Continued)

FOREIGN PATENT DOCUMENTS

| DE | 10103765 A1 * | 8/2001 | B60P 1/26 |
| DE | 10308061 A1 * | 9/2004 | B60J 7/041 |

(Continued)

OTHER PUBLICATIONS

Abstract for KR 10-1998-0029005 U (Hyundai Motors Co) Inventor Seok-Jeong Choi; published Jul. 15, 1998.*

*Primary Examiner* — Glenn Dayoan
*Assistant Examiner* — Paul Chenevert
(74) *Attorney, Agent, or Firm* — Etherton Law Group, LLC

(57) ABSTRACT

A truck bed cover and extender includes two panel assemblies each attached to the inside of one of the bed walls. A panel assembly includes one or more panels attached to a frame. Each assembly is configured to move through three positions: a stowed position, wherein the assembly is stowed inside the truck bed substantially against the wall to which it is attached; a horizontal position, wherein the assembly is substantially horizontal and wherein the assemblies cooperate to form a partial or complete cover of the bed's cargo area; and an extended position, wherein the assembly substantially vertical, extending above the truck bed.

17 Claims, 32 Drawing Sheets

(51) Int. Cl.
*B62D 33/077* (2006.01)
*B60P 7/02* (2006.01)
*B60J 7/14* (2006.01)

(56) References Cited

U.S. PATENT DOCUMENTS

| | | | | |
|---|---|---|---|---|
| 4,216,990 A * | 8/1980 | Musgrove | ................ | B60J 7/041 280/433 |
| 4,542,911 A * | 9/1985 | Mulligan | ................ | B60P 3/32 280/423.1 |
| 4,544,195 A * | 10/1985 | Gunn | ................ | B60P 3/341 135/88.09 |
| 4,652,040 A * | 3/1987 | Mahan | ................ | B60P 3/341 296/159 |
| 4,848,830 A * | 7/1989 | Parson | ................ | B60J 7/041 296/100.05 |
| 5,011,214 A * | 4/1991 | Friesen | ................ | B60J 7/141 160/213 |
| 5,161,851 A * | 11/1992 | Rafi-Zadeh | ................ | B60J 7/1614 108/131 |
| 5,240,301 A * | 8/1993 | Arnold | ................ | B60P 7/14 220/533 |
| 5,335,960 A * | 8/1994 | Benignu, Jr. | ................ | B60P 3/341 135/88.05 |
| 5,344,159 A * | 9/1994 | Powell | ................ | B60J 7/1621 160/213 |
| 6,033,002 A * | 3/2000 | Clare | ................ | B60J 10/00 224/404 |
| 6,224,140 B1 * | 5/2001 | Hoplock | ................ | B60J 7/10 296/100.01 |
| 6,254,169 B1 * | 7/2001 | Arthur | ................ | B60J 7/1621 296/100.04 |
| 6,439,639 B1 * | 8/2002 | Branting | ................ | B60J 7/041 280/423.1 |
| 6,663,160 B2 * | 12/2003 | Yarbrough | ................ | B60J 7/1621 296/100.01 |
| 6,712,418 B1 * | 3/2004 | Lathers | ................ | B60J 7/1614 296/100.02 |
| 6,783,169 B1 * | 8/2004 | Marx | ................ | B60J 7/141 296/100.03 |
| 6,871,896 B1 * | 3/2005 | Owen | ................ | E04H 15/06 135/88.05 |
| 6,902,222 B2 * | 6/2005 | Nykiel | ................ | B60J 7/10 296/100.02 |
| 7,384,089 B1 * | 6/2008 | Ablang | ................ | B60J 7/141 296/100.08 |
| 7,530,621 B1 * | 5/2009 | Curts | ................ | B60J 7/141 296/100.1 |
| 7,735,898 B1 * | 6/2010 | Bridges | ................ | B60J 7/1621 296/100.01 |
| 7,854,458 B2 * | 12/2010 | Hobrecht | ................ | B60J 7/141 296/183.1 |
| 8,376,446 B2 * | 2/2013 | Golden | ................ | B60J 7/041 296/100.01 |
| 8,794,690 B1 * | 8/2014 | Al-Saeed | ................ | B60J 7/1621 296/100.06 |
| 8,814,246 B2 * | 8/2014 | Weller | ................ | B60R 9/00 296/100.08 |
| 2002/0163221 A1 * | 11/2002 | Smith | ................ | B60P 3/341 296/164 |
| 2008/0129067 A1 * | 6/2008 | Rios | ................ | B60J 7/141 296/3 |
| 2015/0197141 A1 * | 7/2015 | Cortez | ................ | B60J 7/141 296/3 |
| 2015/0291017 A1 * | 10/2015 | LaBiche | ................ | B60J 7/141 296/100.09 |
| 2016/0082817 A1 * | 3/2016 | Mulholland | ................ | B60J 7/1621 296/100.1 |

FOREIGN PATENT DOCUMENTS

| | | | | |
|---|---|---|---|---|
| FR | 2908703 A1 * | 5/2008 | ............. | B60J 7/141 |
| FR | 2958617 A1 * | 10/2011 | ............. | B60J 7/141 |
| GB | 1468851 A * | 3/1977 | ............. | B60P 3/32 |
| JP | 2012020694 A * | 2/2012 | ............. | B60P 7/04 |
| KR | 101998029005 * | 7/1998 | ............. | B60P 1/26 |

* cited by examiner

STOWABLE TRUCK BED COVER AND HEIGHT EXTENDER

TECHNICAL FIELD

This invention relates to vehicle cargo beds. This invention relates particularly to a stowable cover that converts into a height extender for a truck bed.

BACKGROUND

Cargo beds of vehicles, such as pickup trucks and trailers, are versatile for hauling many types of cargo. However, a cargo bed cannot be securely closed to protect its contents from weather and theft. Also, cargo beds of pickups have low walls that limit the size and amount of goods to be hauled. Several devices have attempted to resolve both of these problems at once by providing a multiple-section cover that attaches to the truck bed walls and can be moved from a horizontal position, covering the bed, to a vertical position, extending the truck walls.

However, these devices have several drawbacks. Primarily, these devices must be placed in a "cover" or "extended" position, and can never be stowed-away on board the truck. In some cases, such as in U.S. Pat. No. 6,902,222, the device takes up cargo space by attaching to the bed floor or otherwise extending into the bed. Many devices, such as U.S. Pat. No. 6,663,160, attach to the top surface of the bed walls, which may scratch the paint and prevent use of the bed's stake holes, commonly found on this surface. Known devices endeavor to cover the entire bed, so that no goods taller than the bed walls may be transported when the cover is in the horizontal position. A convertible cover that addresses these drawbacks is needed.

In many states, a commercial driver's license and commercial license plates are required to advertise the driver's business on the side of his vehicle while driving. These registrations are considerably more expensive than standard registrations. Without them, it is typically legal to have advertising on the vehicle while it is not in use, so many business owners have advertising magnets that they apply when the vehicle is stopped and remove in order to drive it. Magnets present a problem in that they can be lost or stolen, and they can damage articles that are susceptible to damage from magnets, such as laptop computers. It would be desirable to have advertising on the vehicle that can be hidden without being removed.

Therefore, it is an object of this invention to provide an apparatus for covering and extending the height of a truck bed that can be stowed away in the bed without taking up cargo room. It is a further object that the apparatus not attach to the top surface of the bed walls. It is a further object that the apparatus provide partial cover to allow large goods to be transported in the bed. It is another object to provide a convertible cover/extender for a truck bed that adds versatility to the truck bed. It is a further object that the convertible cover/extender provide a surface for advertising content that may be easily hidden from view.

SUMMARY OF THE INVENTION

A truck bed cover and extender includes two panel assemblies each attached to the inside of one of the bed walls. A panel assembly includes one or more panels attached to a frame. Each assembly is configured to move through three positions: a stowed position, wherein the assembly is stowed inside the truck bed substantially against the wall to which it is attached; a horizontal position, wherein the assembly is substantially horizontal and wherein the assemblies cooperate to form a partial or complete cover of the bed's cargo area; and an extended position, wherein the assembly substantially vertical, extending above the truck bed.

DESCRIPTION OF EMBODIMENTS

Figure 1A:
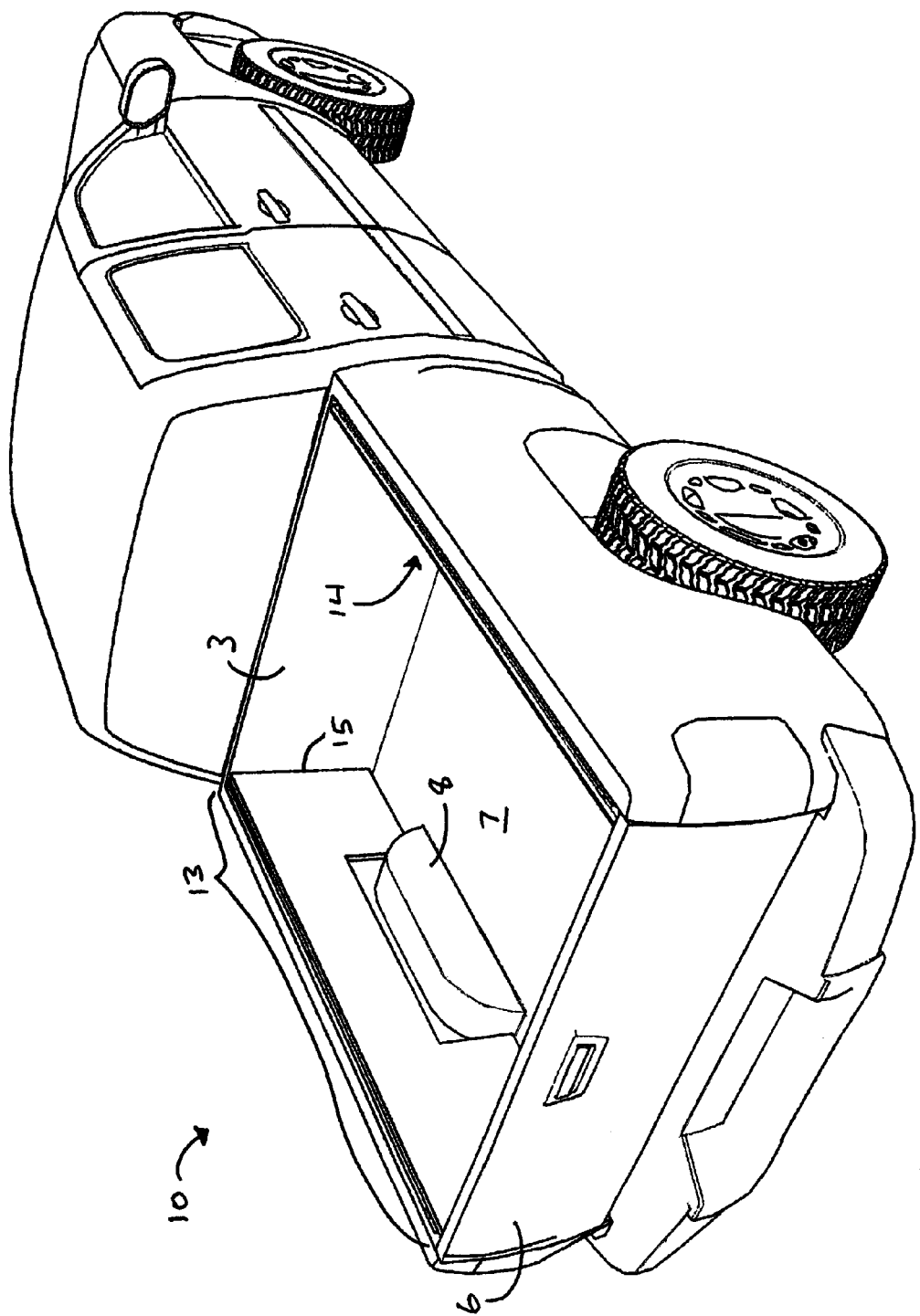
FIG. 1A is a rear right perspective view of a first embodiment of the present invention in the stowed position.
Figure 1B:
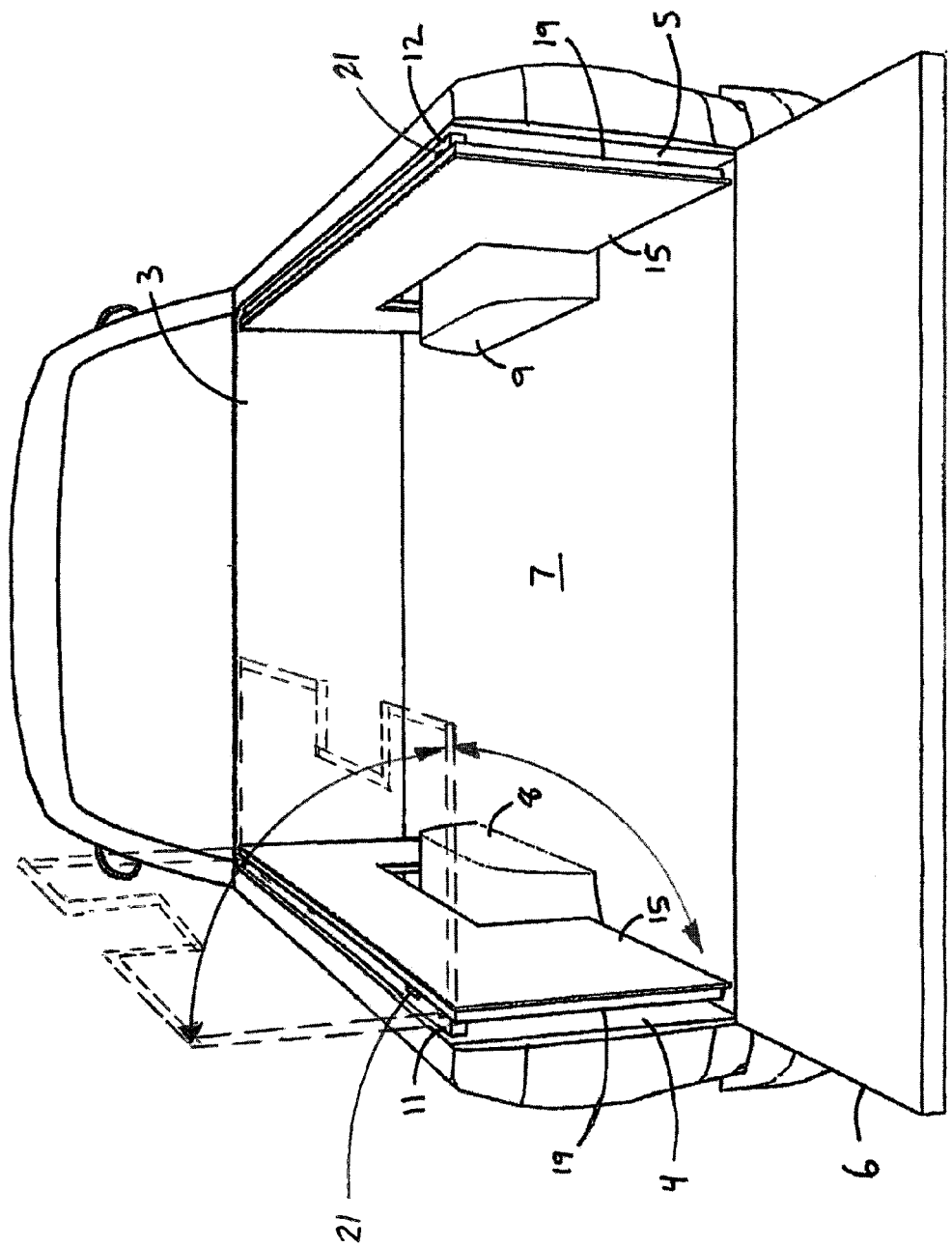
FIG. 1B is a rear perspective view of the embodiment and stowed position of FIG. 1A with the truck tailgate down.
Figure 1C:
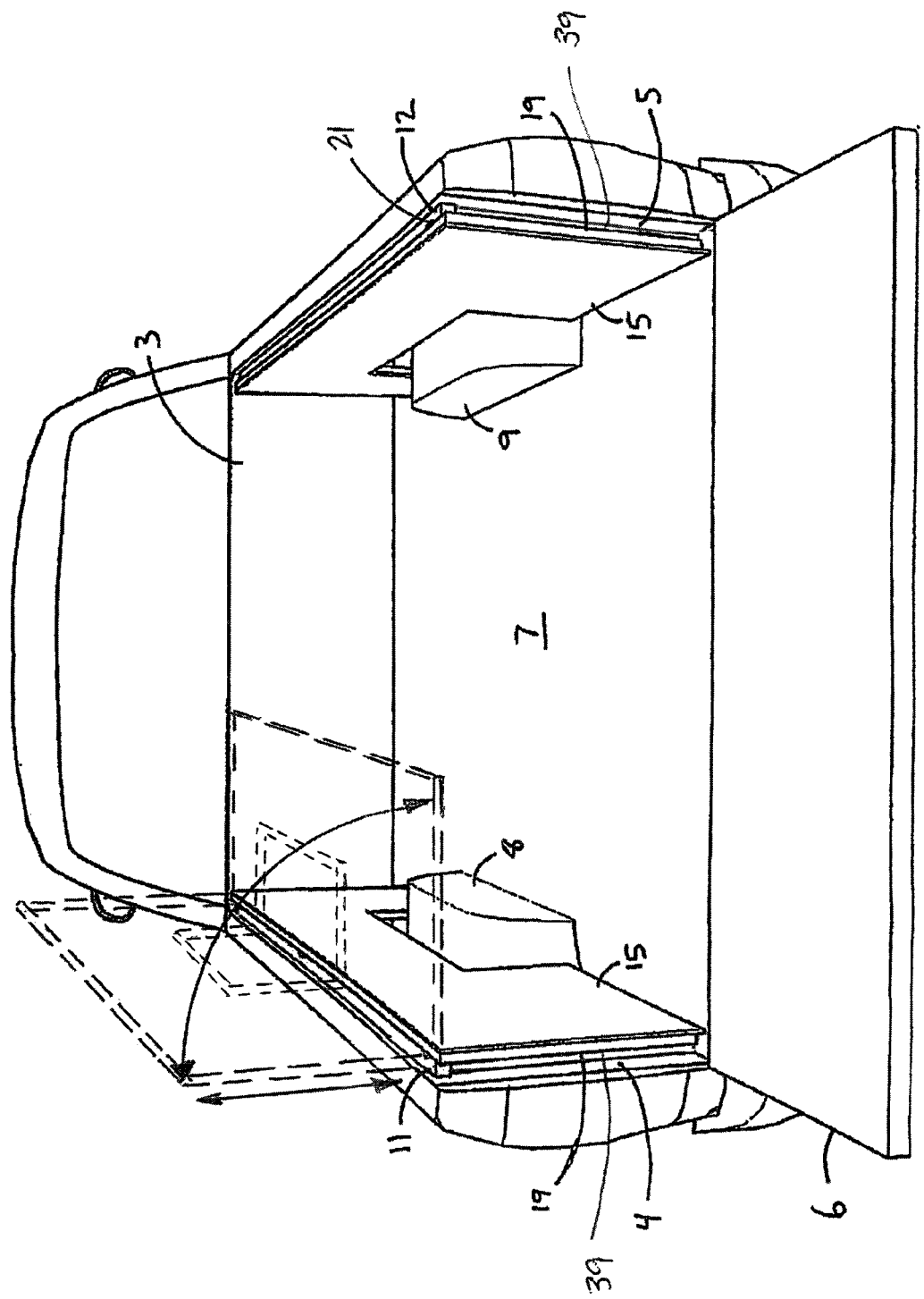
FIG. 1C is a rear perspective view of an alternative embodiment in the stowed position with the truck tailgate down.

The present invention is an apparatus that is installed in the bed of a pickup truck or in an open-top trailer to improve the versatility of the cargo space by providing rotatable flaps that may be fastened in a stowed position that is substantially stowed within the cargo space, a horizontal position that is substantially horizontal to serve as a partial or full cover of the cargo space, and a extended position that is substantially vertical to extend the height of the bed or trailer walls. The apparatus is illustrated and referred to herein as being installed in a pickup truck bed for clarity purposes. The configuration of the components may be selected so that the apparatus may be used in a truck bed of any size.

FIGS. 1A-5 illustrate a first embodiment of the apparatus, designated generally as 10, installed in a truck bed defined by a front wall 3, left wall 4, right wall 5, tailgate 6, and floor 7. The truck bed may have wheel wells 8, 9 extending into the cargo space from the left and right walls 4, 5. The apparatus 10 includes left and right base beams 11, 12 attached to the inner surface of the left and right walls 4, 5, respectively, at or near the top of each wall. Each base beam 11, 12 extends substantially the length of the bed from the front wall 3 to the tailgate 6 and is substantially parallel to the floor 7. The base beams 11, 12 are preferably steel, aluminum, or another metal, and may be permanently or removably attached to the wall 4, 5.

The base beams 11, 12 provide support and an attachment surface for one or more panel assemblies 13, 14. The assemblies 13, 14 comprise one or more panels 15, 16 attached to a frame 19. The frame 19 provides an underlying structure for attachment of the panels 15, 16 and other components described below. The frame 19 may have any shape suitable for attachment of the panels, but preferably the shape of the frame 19 is an outline of the preferred configuration of panels. The panels may be attached to the frame 19 substantially near their peripheries to provide the best structural strength to the panel assembly. The frame 19 is preferably comprised of a plurality of steel bars, but may be made of another metal or of plastic or wood. In one embodiment, the frame 19 of each assembly 13, 14 is hingedly attached to its corresponding base beam 11, 12 so that it may be rotated from the stowed position inside the truck bed, through the horizontal position, and to the position extending substantially vertically from the truck bed. Each assembly 13, 14 may be retained in any of the three positions. See FIGS. 1B and 3B. Preferably, the frame 19 is attached by assembly hinges 21 to the base beam 11, 12 and rotated about the axis of the assembly hinges 21, which is substantially parallel to the floor 7 of the bed.

In another embodiment, the frame 19 of each assembly 13, 14 is slidably attached to its corresponding base beam 11, 12 so that it may lifted from a stowed position to an extended position. See FIGS. 1C and 3C. The frame 19 slides along carrier channels 39, such as telescoping square tubes or c-channel tubing to the extended position. The assemblies 13, 14 can then be rotated to a horizontal position. A slot-and hinge or ball-and-socket mechanism can be used to attach the assembly hinges 21 to the base beam 11, 12 to enable lifting and rotation into the horizontal position.

A frame 19 may be divided into multiple sections that are attached to each other and move together or separately. In the first embodiment, each frame 19 comprises a main section 22 and a first middle subsection 23 attached to the main section 22 by frame hinges 24. The first middle subsection 23 rotates about the axis of the frame hinges 24, which may be substantially parallel to the assembly hinges 21, from an extended position that is coplanar with the main section 22, through 180 degrees to a retracted position that is inside and adjacent to the main section 22. The first middle subsection 23 is rectangular, having height and length equal to or greater than the height and length of the wheel wells 8, 9. Correspondingly, the main section 22 may have a maximum height that is equal to or shorter than the height of the left and right walls 4, 5, a maximum length that still may be disposed between the front wall 3 and the tailgate 6, and an irregular shape such that when the first middle subsection 23 is in the extended position, the main section 22 and first middle subsection 23 taken together comprise a frame 19 having a substantially rectangular shape. FIGS. 14-19 illustrate another embodiment, which may particularly benefit trucks with short beds or irregularly-shaped wheel wells 8, 9. In this embodiment, each frame 19 may comprise a main section 22 and a forward section 17 extending from the rear edge of the wheel well 8 to the front of the truck bed. The forward section 17 receives a forward panel 18 and folds into a retracted position as described below.

In operation, the first middle subsection 23 folds into the retracted position, allowing the panel assemblies 13, 14 to be folded into the first, folded-away position with the wheel wells 8, 9 protruding through the space in the assemblies 13, 14 left by the retraction of the first middle subsection 23. Any section of a frame 19 may be further divided into additional subsections according to the versatility desired. For example, some trucks have such large wheel wells 8, 9 that a first middle subsection 23 that folds as described would be too large to easily fold up and down. Referring to FIG. 2B, the first middle subsection 23 may in this case be divided widthwise to form a front half 16a and a rear half 16b. The divided portions of the forward and rearward middle subsections may be hinged to the main section 22 perpendicularly to the assembly hinges 21 and may fold inwardly in opposite rotational directions into the retracted position.

Each panel 15, 16 is permanently or removably attached to the frame 19 on the outside of the frame 19, the outside being the side that faces away from the truck bed when the device 10 is in the extended vertical position. At least one panel is attached to each section of the frame 19. Preferably in the first embodiment, a main panel 15 is attached to and follows the outline of the main section 22 of each frame 19, and a rectangular middle subpanel 16 is attached to the first middle subsection 23 of each frame 19. In another embodiment, one or more of the panels may be attached to its respective frame by hinges, so that the panel functions as an access panel, opening like a door to provide access to the cargo area when the assemblies 13, 14 are in the horizontal or extended position. The panels 15, 16 are made of a substantially weather-resistant material, such as polyvinyl chloride or another polymer, aluminum, or fiberglass. The panels 15, 16 preferably have uniform thickness, such that when all of the subsections of the frame 19 are in their extended position, the panels 15, 16 cooperate to form a substantially planar flap that serves as a partial bed cover in the horizontal position and a sideboard in the vertical position. The panels 15, 16 are preferably sized to leave a very small or nonexistent gap between them. One or both of the adjacent panels 15, 16 may be fitted with a gasket positioned to fill such a gap and improve the weather resistance of the flap. The panels 15, 16 may be configured to receive printing or other treatment, such as an advertising graphic, on the outside surface so that it is visible to others when the flaps are in the vertical position but not visible when the flaps are retracted.

Each panel assembly 13, 14 may further comprise one or more fasteners and one or more positioners attached to the frame 19. Fasteners may include one or more section latches 25 configured to fasten frame 19 subpanels, such as the first middle subpanel 23, into either the extended or retracted position; and one or more frame latches (not shown) configured to fasten the panel assemblies 13, 14 into the horizontal position. Positioners may include one or more retractable posts 26 positioned on or within the frame and configured to be moved from a retracted position to an extended position and back. In the extended position, the posts 26 may contact one or both of the front wall 3 and tailgate 6 to hold the assemblies 13, 14 in the horizontal position. In one embodiment, the post 26 is a metal plate mounted to the frame 19 with a bolt around which the post 26 may rotate. Preferably, however, the post 26 is inset within the hollow bar that comprises the frame and is slidably mounted to the frame 19. The post 26 may be attached to a set screw that is used to secure the post 26 in the retracted or extended position, and may also be grasped and used to slide the post 26 between positions. The post 26 may be coated or otherwise covered with a material, such as rubber, that will prevent damage to the front wall 3 or tailgate 6.

In addition to or instead of the posts 26, one or more braces 60 may attach to each assembly 13, 14 in order to support the assemblies 13, 14 in the horizontal position. The brace 60 attaches to the inside of the frame 19 at the front, rear, or both ends of the frame 19. The brace 60 is preferably attached at its proximal end to the frame 19 using a bolt or other suitable attachment mechanism so that the brace 60 may pivot at its proximal end. In its stowed position, the brace 60 is parallel to the frame 19 and essentially "hides" behind the adjacent bar of the frame 19. The brace 60 may be secured in the stowed position by a clip or other fastener (not shown).

In its extended position, the distal end of the brace 60 attaches to an anchor 65 attached to the inner surface of the adjacent side wall 4, 5. In this position the brace 60 buttresses the assembly against the side wall. Preferably, the brace 60 comprises telescoping major and minor brace bars 61, 62 that are secured for placement in the stowed or extended positions with a lock pin 63. (For clarity of FIG. 3C, the brace 60 is not shown on the left side wall.)

The apparatus 10 further comprises one or more support assemblies 27 configured to secure the assemblies 13, 14 in the extended vertical position. See FIG. 5. A crossbar 28 extends substantially perpendicularly from the left assembly 13 to the right assembly 14 and fits into crossbar holes that extend into the frame 19 on each assembly 13, 14 acting as a brace to help keep the assemblies in a vertical position. Preferably, two crossbars 28 are used, one inserted at or near the front and rear of each frame 19. Preferably, the crossbar holes are recessed as shown in FIGS. 3 and 4 so that the top of the crossbar 28 is substantially coplanar with the "top" surface, being the surface at the highest extent in the vertical position, of each assembly 13, 14. The support assembly 27 may further comprise one or more support poles 29 attached to the underside of the crossbar 28. In the illustrated embodiment, the support pole 29 is a telescoping pole that is rotatably attached at one end to a mount plate extending from the crossbar 28, and removably attached, such as with a clip 31, to the crossbar at the other end. A locking pin 32 retains the inferior pole 34 in one of two positions with respect to the superior pole 33: in the retracted position, the inferior pole 34 slides into the superior pole 33 and is clipped to the crossbar 28; in the extended position, the inferior pole 34 slides substantially out of the superior pole 33 and removably attaches at the distal end to the frame 19 of the opposite assembly 13 or 14. The support pole 29 thus serves as a diagonal brace for the assemblies 13, 14. The support assemblies 27 are preferably configured to be stowed within the truck bed, most preferably by attaching, with a clip, magnet, or the like, to the underside of one of the base beams 11, 12.

As illustrated in FIG. 1, in the folded-away or stowed position, the panel assemblies 13, 14 are stowed within the truck bed, substantially out of sight from outside of the truck because the base beams 11, 12 are mounted slightly below the top surface of the bed walls 4, 5. The apparatus 10 takes up an insignificant amount of cargo space due to its being folded over the wheel wells 8, 9. Preferably, in this stowed position the panel assemblies 13, 14 project no more than 1.75 inches from their respective walls 4, 5 into the cargo space, and most preferably no more than 1.5 inches, depending on the dimensions of the materials used to make the frames 19 and panels 15, 16.

Figure 2A:
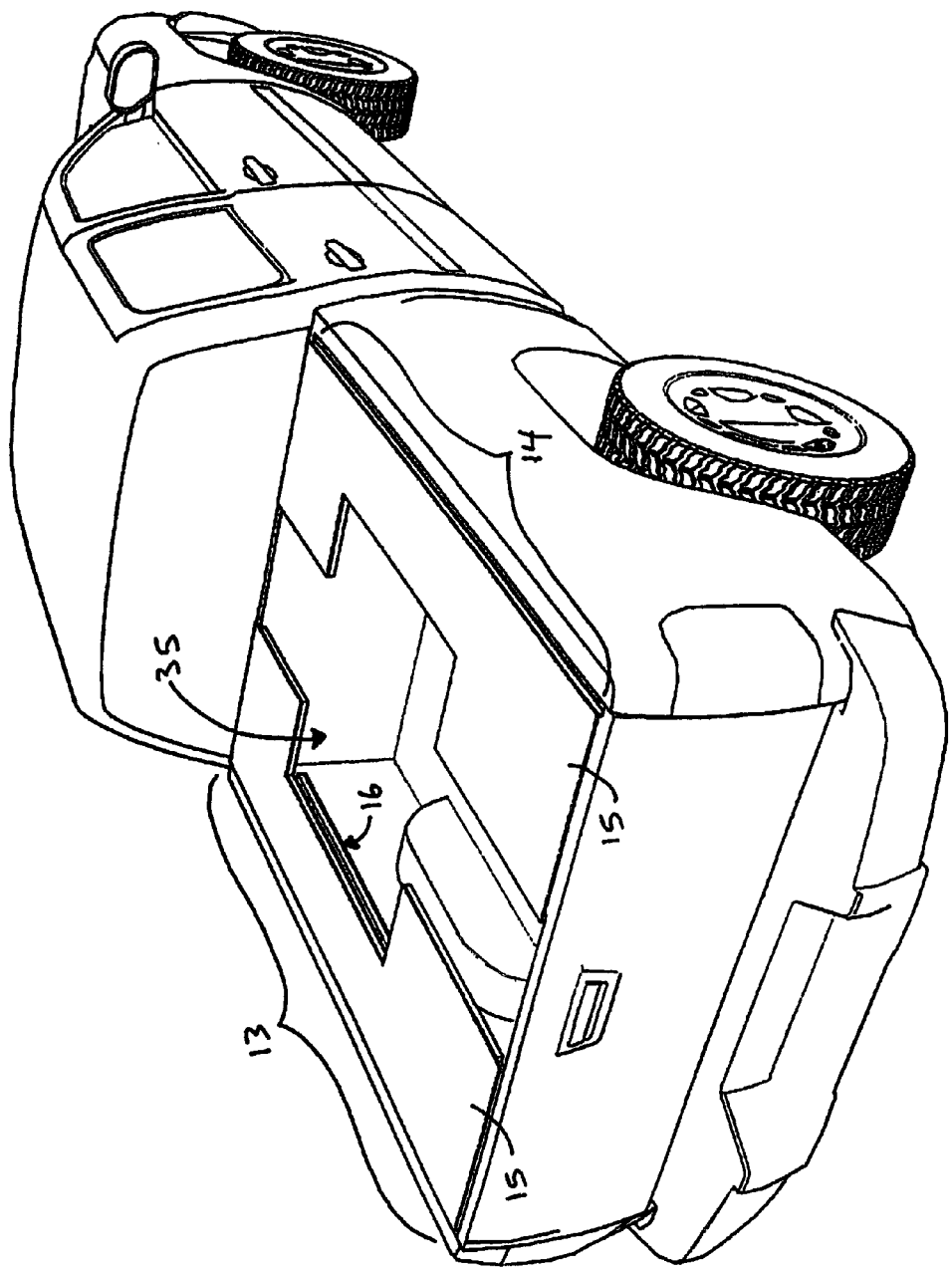
FIG. 2A is a rear right perspective view of the first embodiment of the present invention in the horizontal position with the middle subpanels retracted.
Figure 2B:
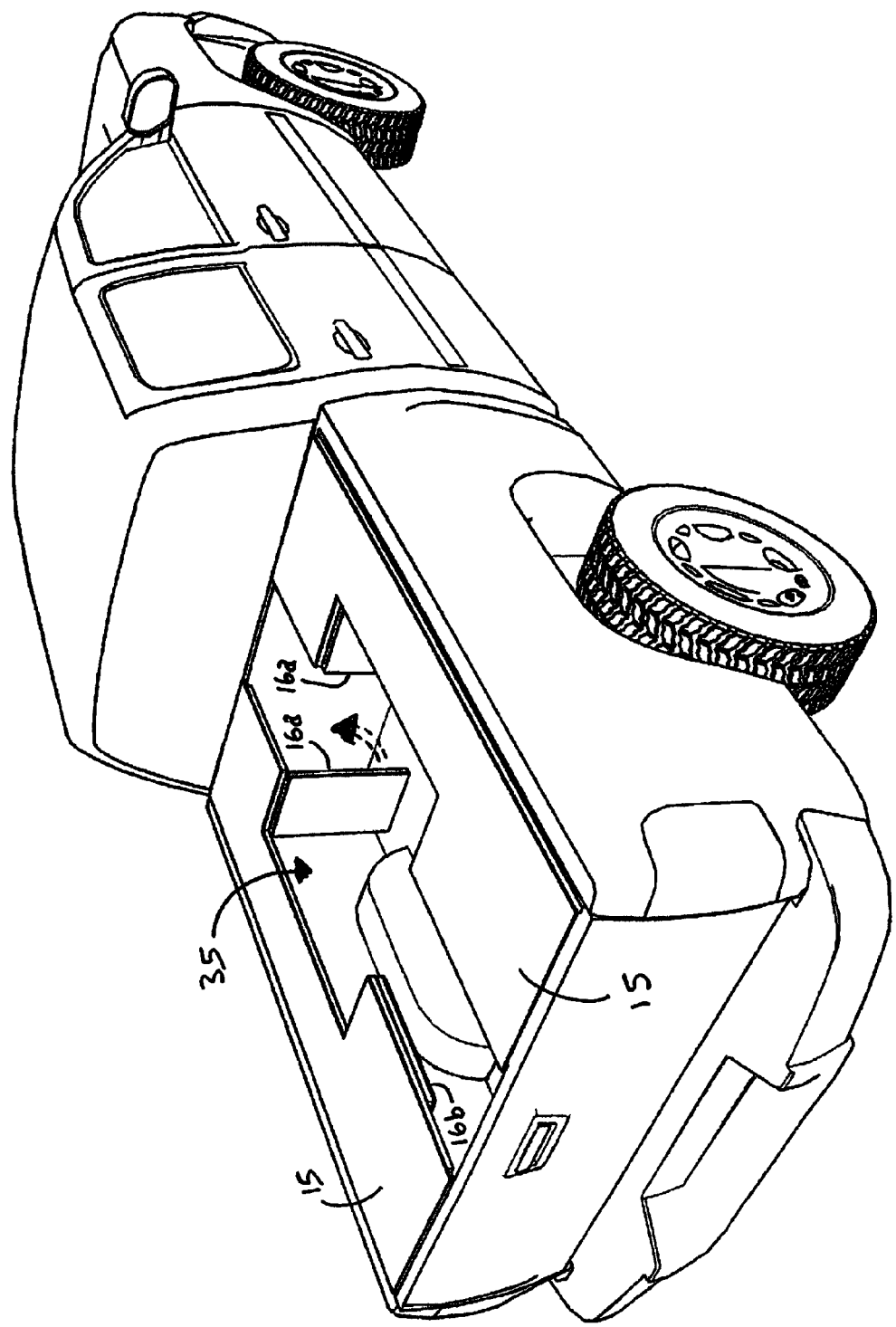
FIG. 2B is a rear right perspective view of an alternate embodiment of FIG. 2A showing subpanels retracted perpendicularly.
Figure 3A:
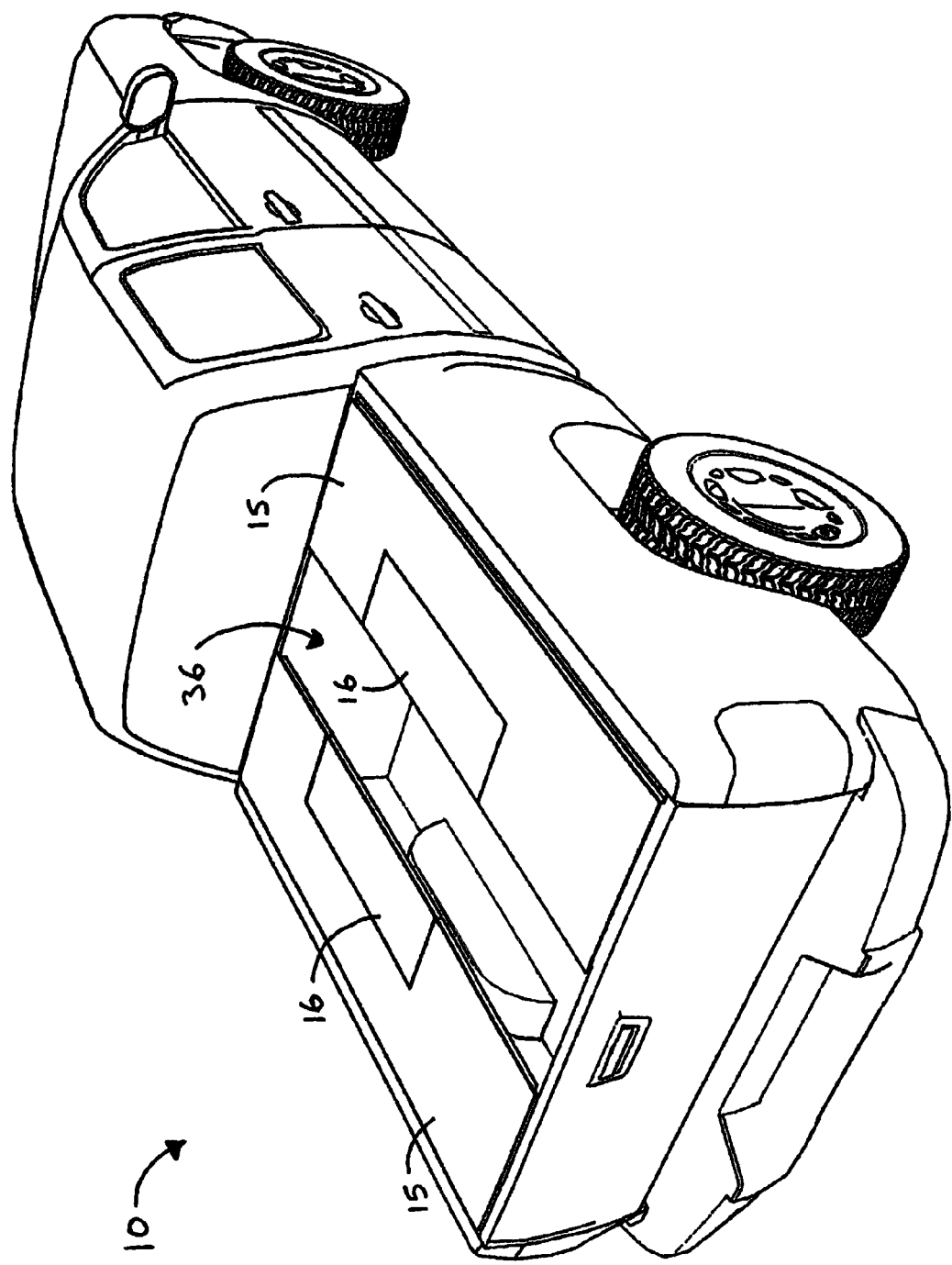
FIG. 3A is a rear right perspective view of the first embodiment of the present invention in the horizontal position with the middle subpanels extended to form flaps.
Figure 3B:
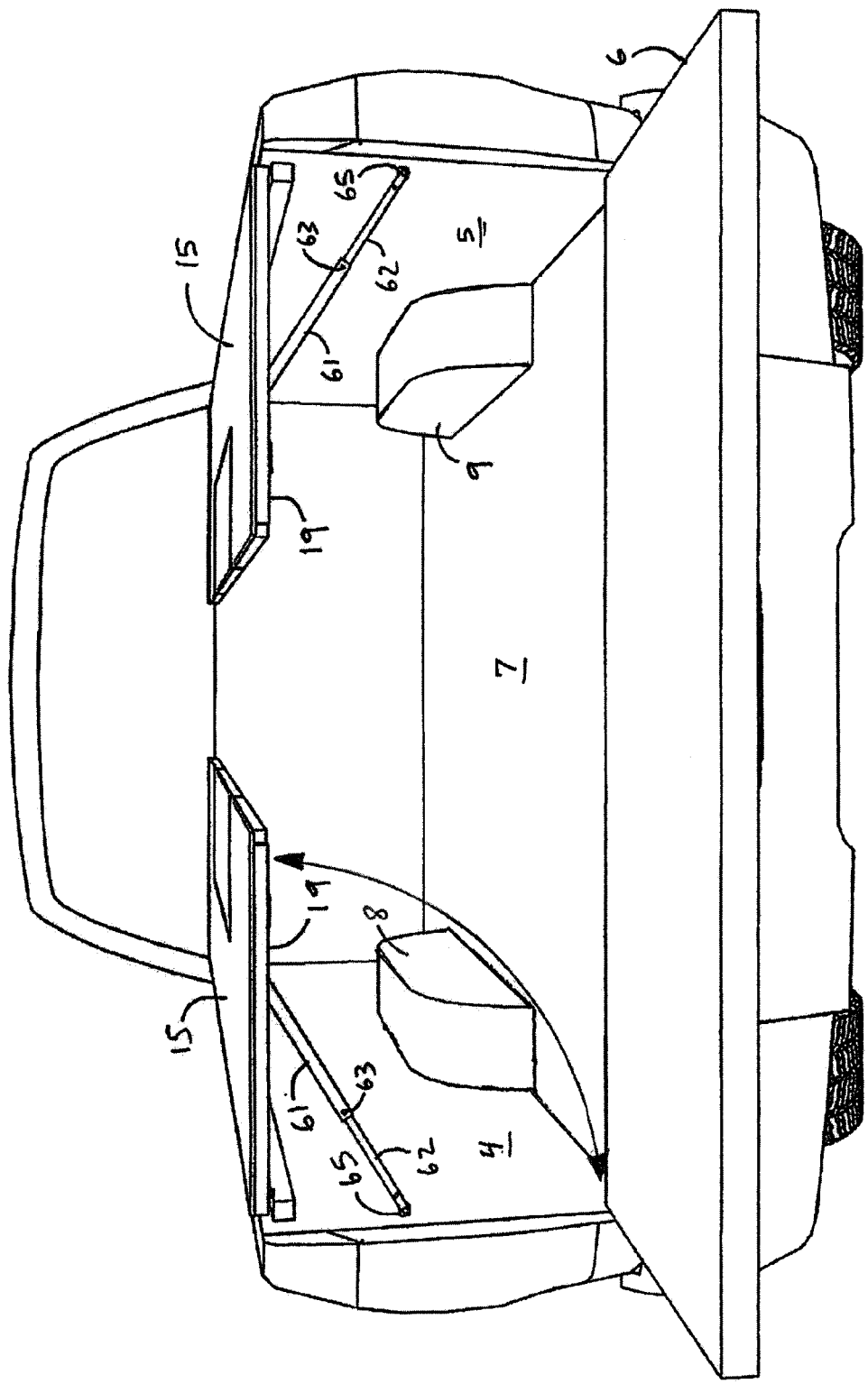
FIG. 3B is a rear perspective view of the embodiment and horizontal position of FIG. 3A with the truck tailgate down.
Figure 3C:
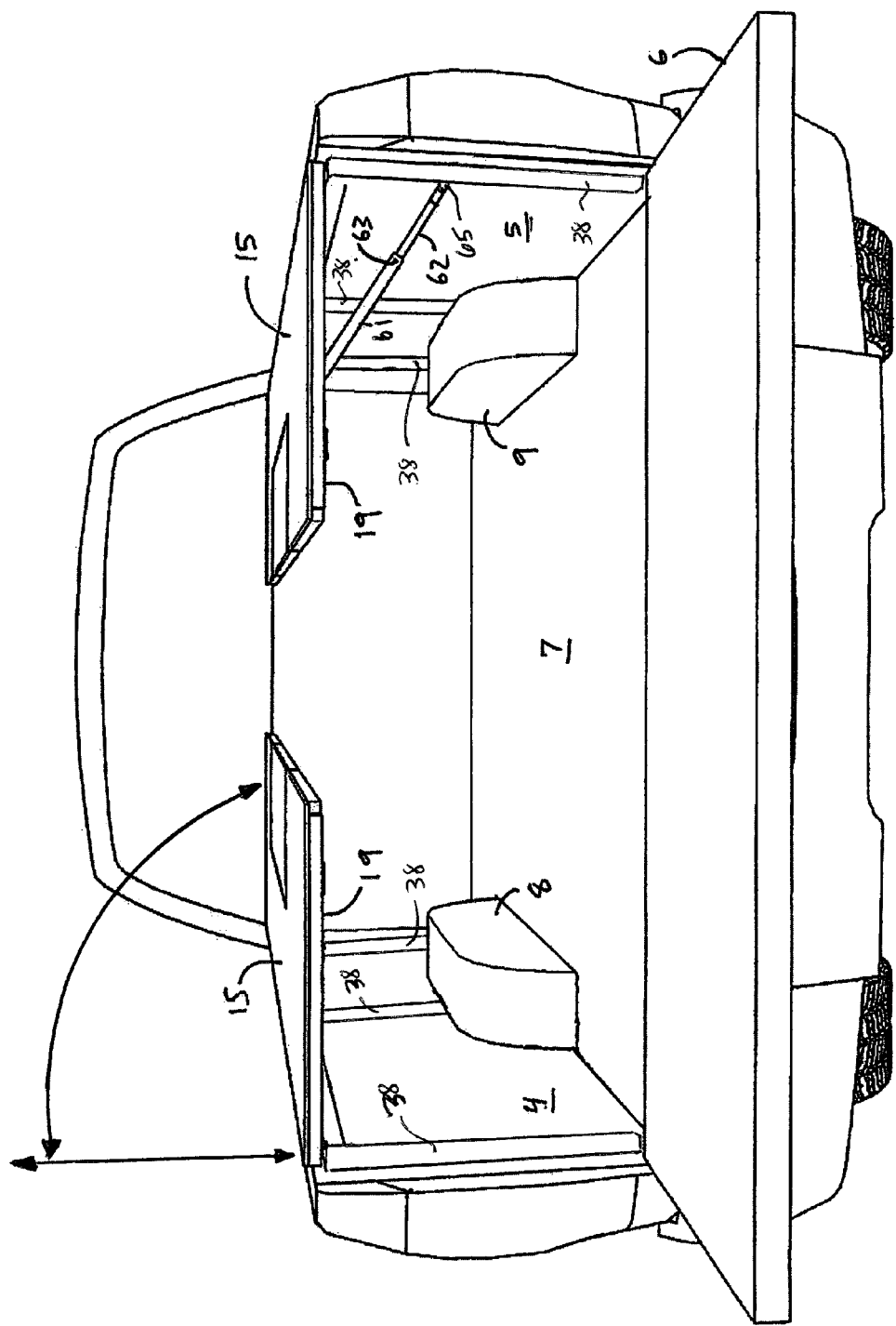
FIG. 3C is a rear perspective view of an alternative embodiment and horizontal position with the truck tailgate down.
Figure 4:
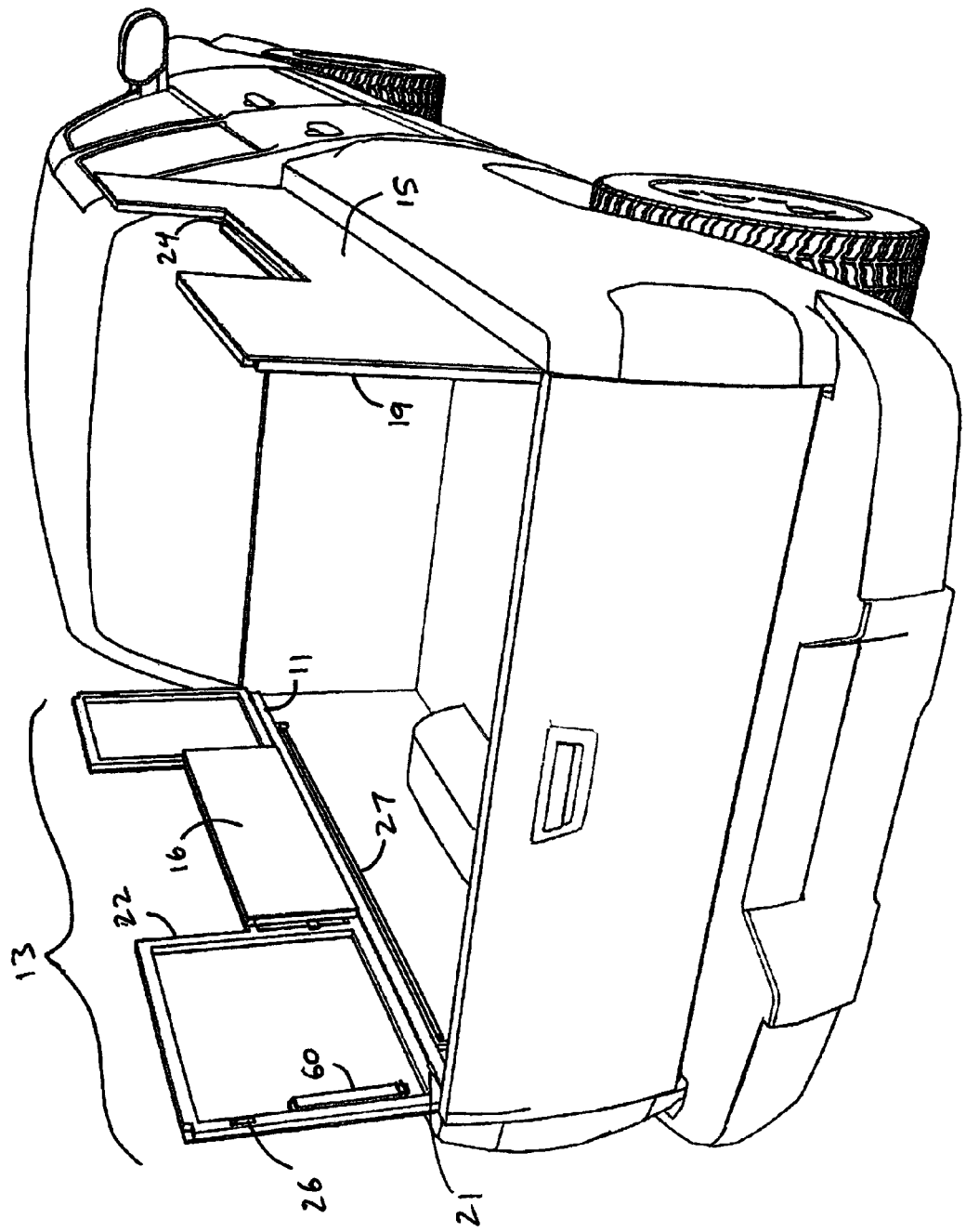
FIG. 4 is a rear right perspective view of the first embodiment of the present invention in the extended position with the middle subpanels retracted and the support assemblies stowed beneath the base beams.

FIGS. 2A-3B illustrate the assemblies 13, 14 fastened in the horizontal position, forming a partial cover over the cargo area. Referring to FIG. 2A, the first middle subsections 23 of each frame 19 may be fastened in the retracted position while the assemblies 13, 14 are in the horizontal position, creating a large rectangular opening 35 in the cover. This configuration is useful for trucks with a gooseneck hitch mounted in the bed, because the rectangular opening will be positioned optimally to receive the gooseneck from a trailer to be attached to the receiver centered in the bed over the axle. FIG. 2B illustrates an embodiment of the apparatus 10 in the position of FIG. 2A for trucks with particularly wide wheel wells 8, 9. In this embodiment, the middle subpanels 16 are further subdivided into front halves 16a and rear halves 16b to keep the subsections small and easily foldable. The front and rear halves 16a-b fold along an axis perpendicular to the base beams 11, 12. Referring to FIGS. 3A-B, when the subpanels are moved into the extended position to form flaps, a substantially linear gap 36 may be left between the left and right flaps. The gap 36 may be utilized for transporting tall, narrow cargo while covering the rest of the cargo space. See below and FIGS. 6 and 7.

Figure 5:
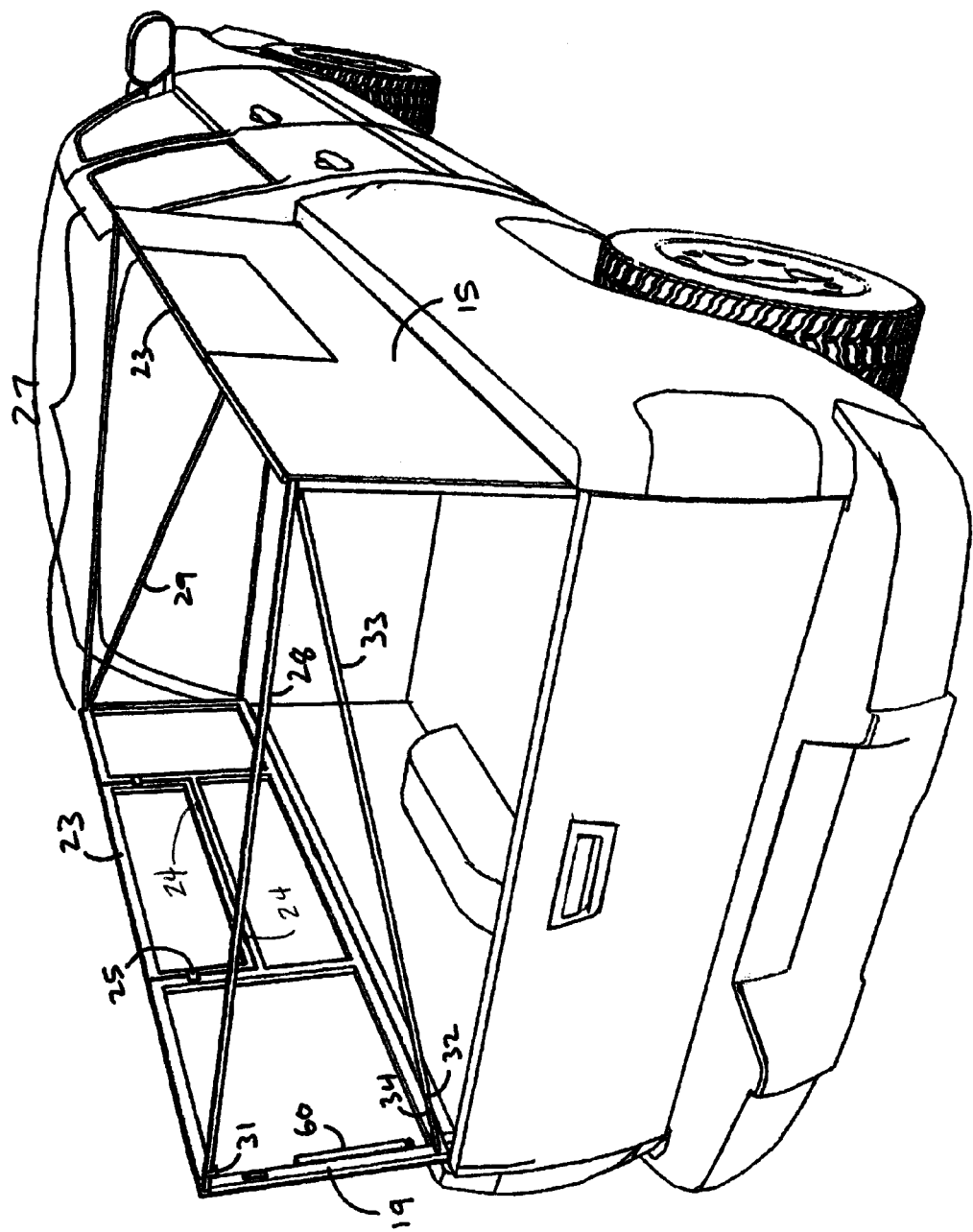
FIG. 5 is a rear right perspective view of the first embodiment of the present invention in the extended position with the middle subpanels extended and the support assemblies in use.

FIGS. 4 and 5 illustrate the assemblies 13, 14 expanded into wings and positioned and fastened in the extended vertical position. The apparatus 10 adds significant volume to the cargo space by extending it vertically. In addition to lending rigidity to the assembly 10, the support poles 29 may prevent articles from falling out of the back of the truck. In the illustrated configuration, the truck driver can easily see out of his back window. If desired, and if permitted by vehicle regulations, additional separable panels may be attached to the support assemblies 27 to create a panel enclosure on all four sides.

In the configuration of FIG. 5, the apparatus 10 will support a flexible top, placed over the crossbars 28. See FIGS. 6A-C. The cover 46a is preferably canvas but may be plastic, Goretex®, or another flexible material depending on the intended use. The cover may be attached to one or more of the frame 19, panels, crossbars 28, or the truck itself, via snaps, Velcro®, or another suitable removable attachment device. The flexible top may be a retractable cover 46a that rolls into a stowed position inside a cover container 48. The cover container 48 is preferably a hollow cylinder attached to the top of the front wall 3 and extending for substantially the width of the truck bed. Preferably the distal end of the cover 46a is attached to the container 48 and the attachment mechanism (not shown) is biased to draw in and roll up the cover 46a. A rigid member 47, such as a handle bar, may be attached to the proximal end of the cover 46a to prevent the end from rolling up into the container 48, to use as a handle to pull out the cover 46a, and to use as an anchor, such as by attaching to the frame 19 of each assembly 13, 14, to hold the cover 46a in one or more extended positions.

In another embodiment, the cover 46b is substantially rigid and may comprise one or more fiberglass or metal sheets that extend between the panel assemblies 13, 14 and cover one or more of the top, front, and back of the apparatus 10 when it is in the extended vertical position. In one embodiment, the rigid cover 46b is L-shaped, comprising a horizontal sheet that fits over the top and a vertical sheet that fits over the back of the apparatus 10. In another embodiment, the rigid cover 46b is C-shaped, comprising one horizontal and two vertical sheets for completely enclosing the truck bed. One or more apertures (not shown), such as a window or vent, may be disposed through the rigid cover 46b.

Figure 6A:
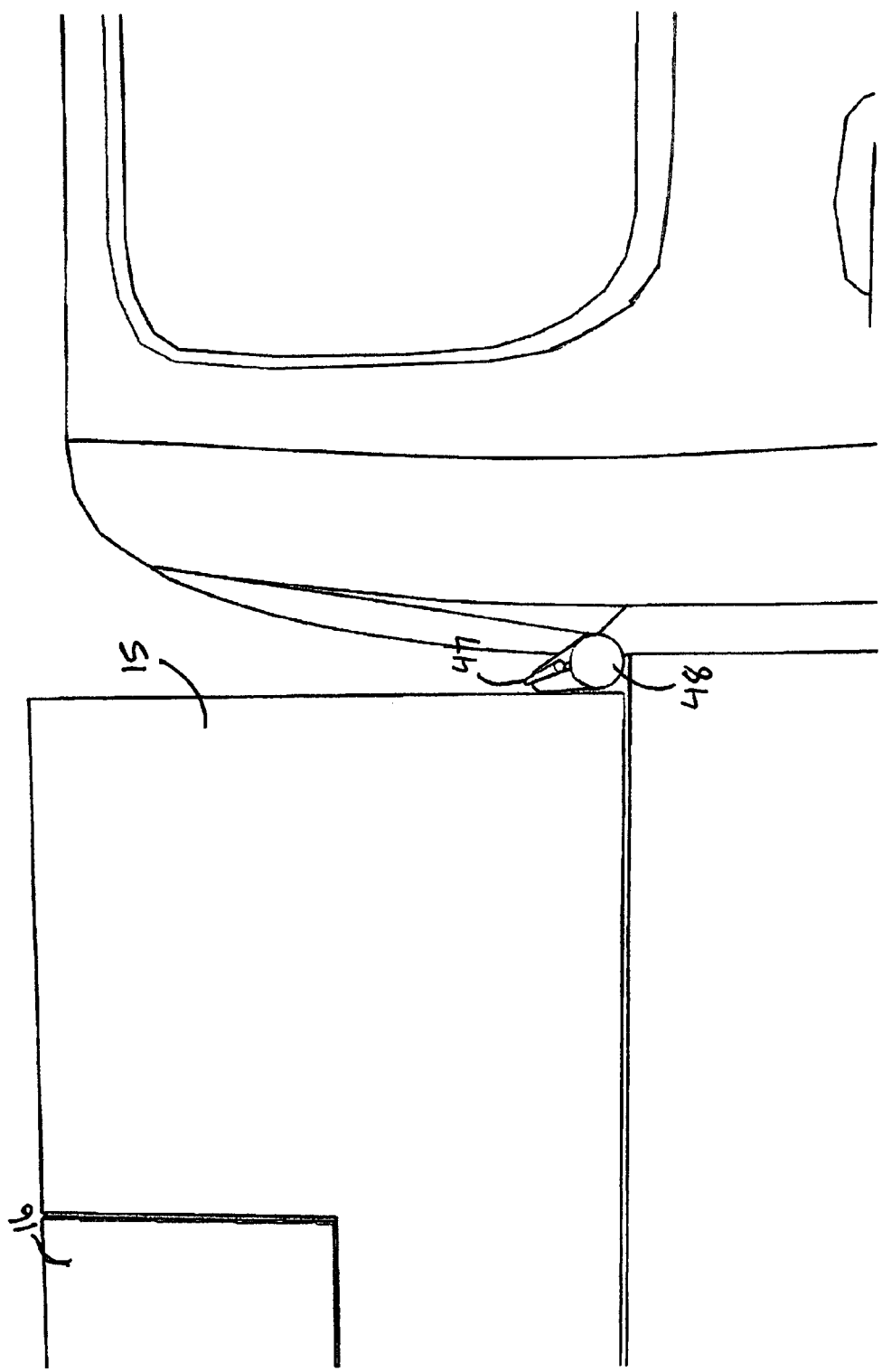
FIG. 6A is a right side perspective view of an embodiment of a cover container.
Figure 6B:
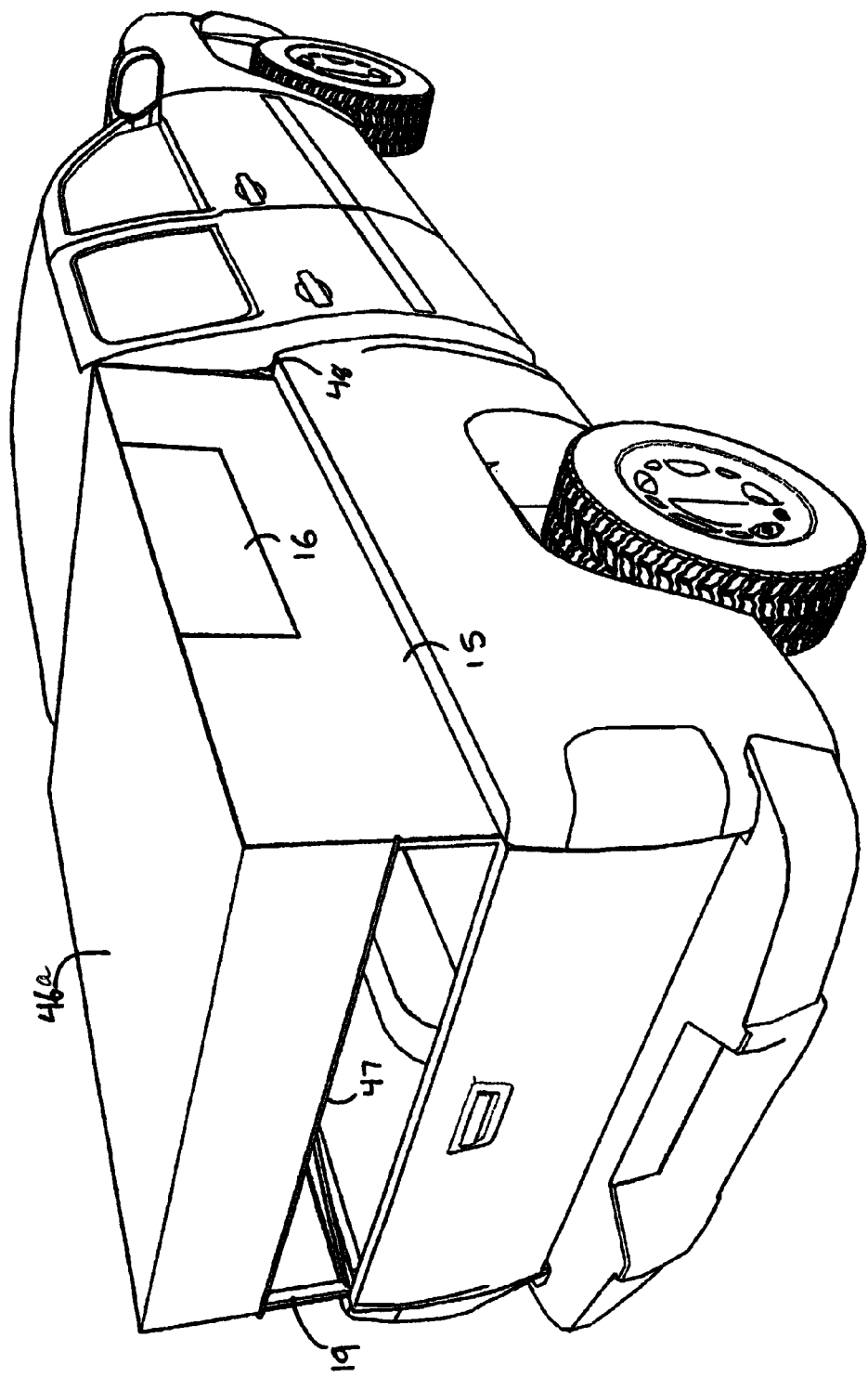
FIG. 6B is a rear right perspective view of the embodiment of FIG. 5 with a cover pulled substantially over the apparatus.
Figure 6C:
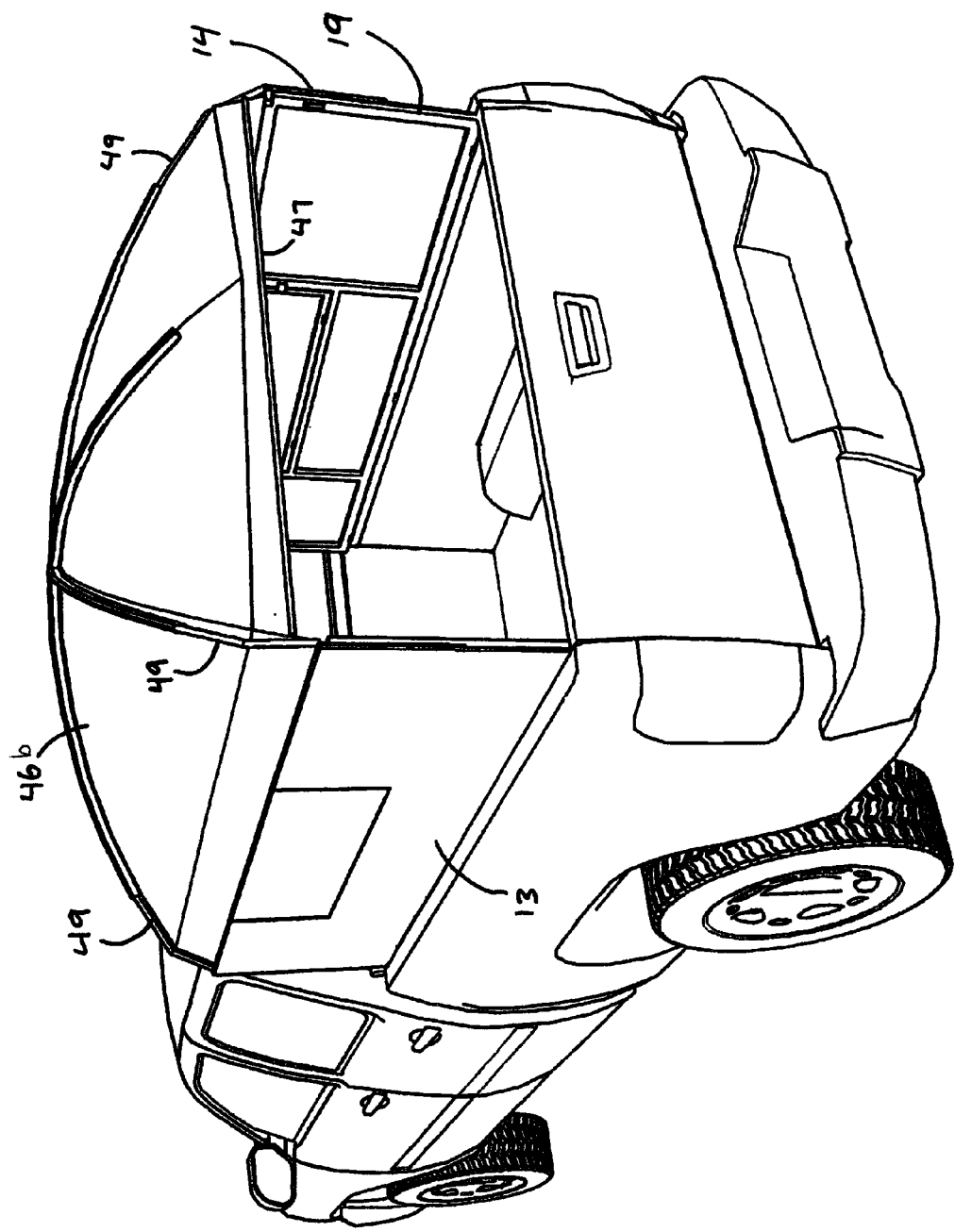
FIG. 6C is a rear left perspective view of an alternate embodiment of FIG. 6B showing a tent pulled over the top of and attached to the apparatus.
Figure 6D:
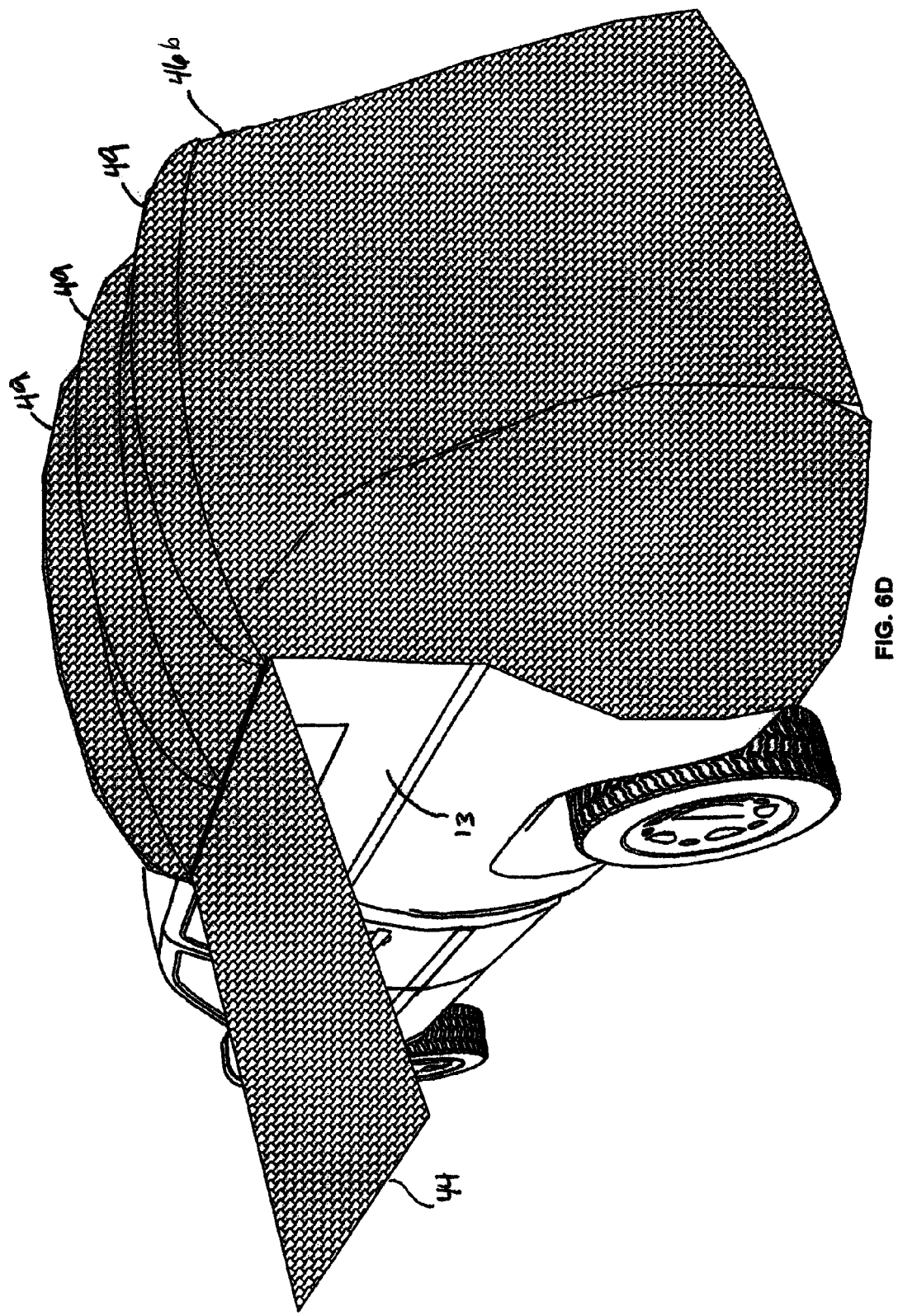
FIG. 6D is a rear left perspective view of an alternate embodiment of a tent pulled over the top of and attached to the apparatus.

In a particular embodiment for camping, the cover 46a may comprise a tent made of a flexible material, such as rip-stop nylon, canvas, or other materials known in the art. See FIGS. 6C and 6D. The crossbars 28 may be convex with respect to the floor 7, providing additional headroom when the cover 46a is draped over the assembly 10. One or more of the crossbars 28 may further comprise, or be replaced or supported by, collapsible tent poles 49 known in the art. The tent poles 49 may attach diagonally between the front of one panel assembly and the back of the other panel assembly as shown in FIG. 6C to form an apex near the center of the tent. Alternatively, the tent poles may extend perpendicularly from each panel assembly 13, 14, as shown in FIG. 6D. The cover 46a may have flaps 44 that extend from the truck to provide shade. The flaps 44 may extend around one or more sides of the truck, contiguously or as separate flaps. Complete coverage of the truck may be achieved by using flaps extending around the entire truck. This may be especially useful to hunters who want to temporarily camouflage their trucks. The tent may be configured to lay flat so it can be rolled and stowed in the cover container 48, or the tent may be stored separately.

Referring to FIGS. 7A-D, the apparatus 10 may further comprise a removable shelf 70. The shelf 70 comprises a shelf frame 71 to which a platform (not shown) is attached. The platform may be flexible or rigid, and may comprise a fabric or metal mesh, a screen, a piece of sheet metal, a pressed wood board, or another suitable material for holding articles on it. The shelf frame 71 is configured to attach the shelf 70 to one or both of the assemblies 13, 14, and may further be configured to attach the shelf 70 to one or more of the bed walls 3-5 or tailgate 6. In the illustrated embodiment, slidably-engaging bolts 73 are retained adjacent to the shelf frame 71 with sleeves 72 that are attached to or integral with the shelf frame 71. The bolts 73 are configured to extend outward from the shelf frame 71 and fit into bolt rings 76 particularly positioned on the surface of the frame 19 to fasten the shelf 70 into a desired position. Alternatively, the bolts 73 may fit into one or more pockets 78 disposed within the frame 19. Thusly, the shelf 70 may be installed parallel to the floor 7 and adjacent to the front wall 3 when the assemblies 13, 14 are in the extended vertical position.

The shelf 70 may further comprise one or more L-brackets 79. The L-brackets 79 may be permanently or removably attached to the front wall 3 or tailgate 6. Preferably, the L-brackets 79 each fit into a mount 77 that is bolted to the front wall 3 or tailgate 6. Preferably there are L-brackets 79 and two mounts 77, allowing the mounts 77 to also be used to mount the shelf 70 vertically as described below. Each L-bracket 79 further may fit matedly into one or more bracket rings 74, 75 attached to or integral with the shelf frame 71. Specifically, one end of the L-bracket 79 fits into the mount 77 and the other end of the L-bracket 79 fits into either the vertical bracket ring 74 or horizontal bracket ring 75 according to the desired orientation of the shelf 70.

Figure 7A:
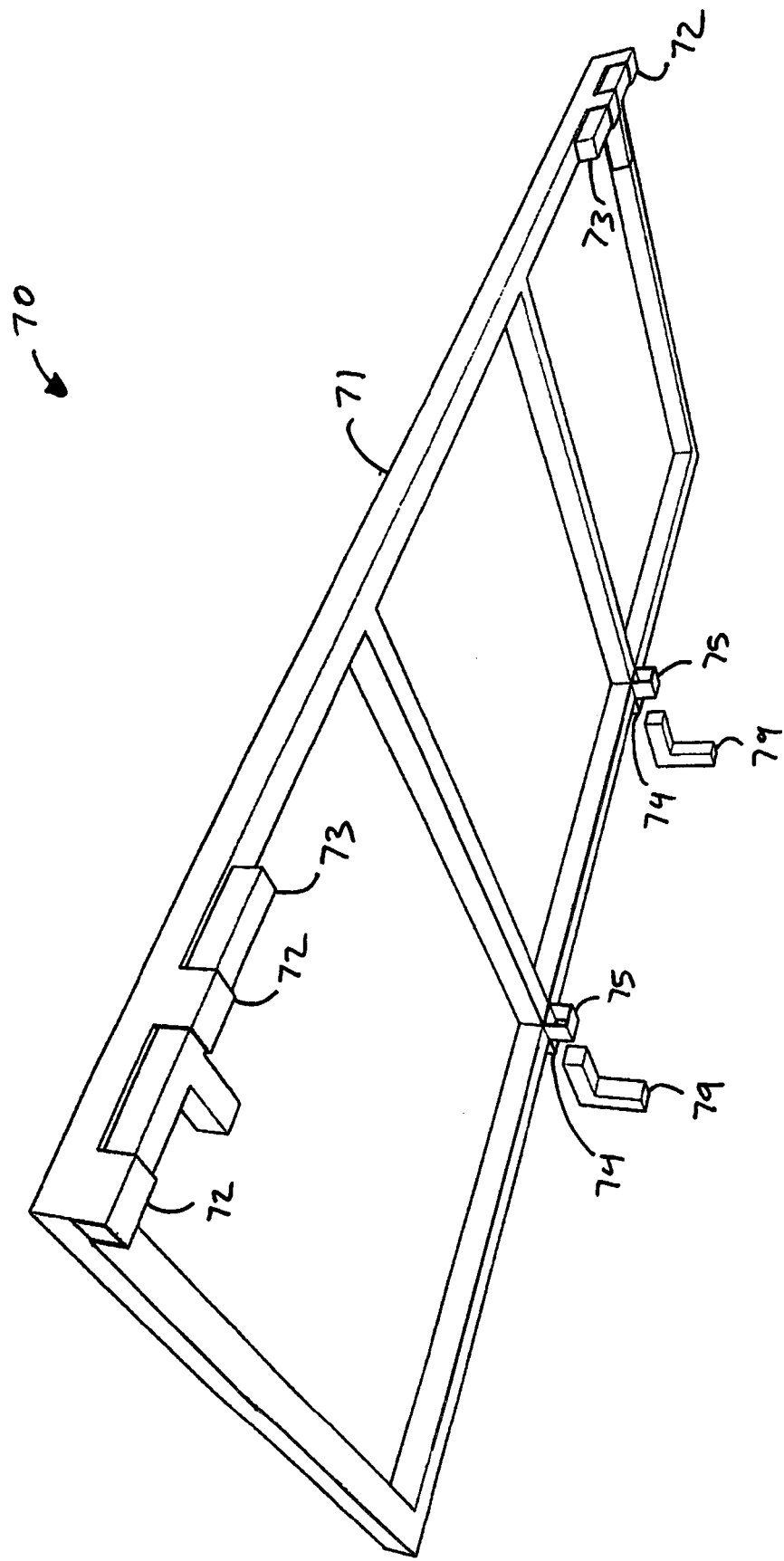
FIG. 7A is a front view of a removable shelf of the apparatus.
Figure 7B:
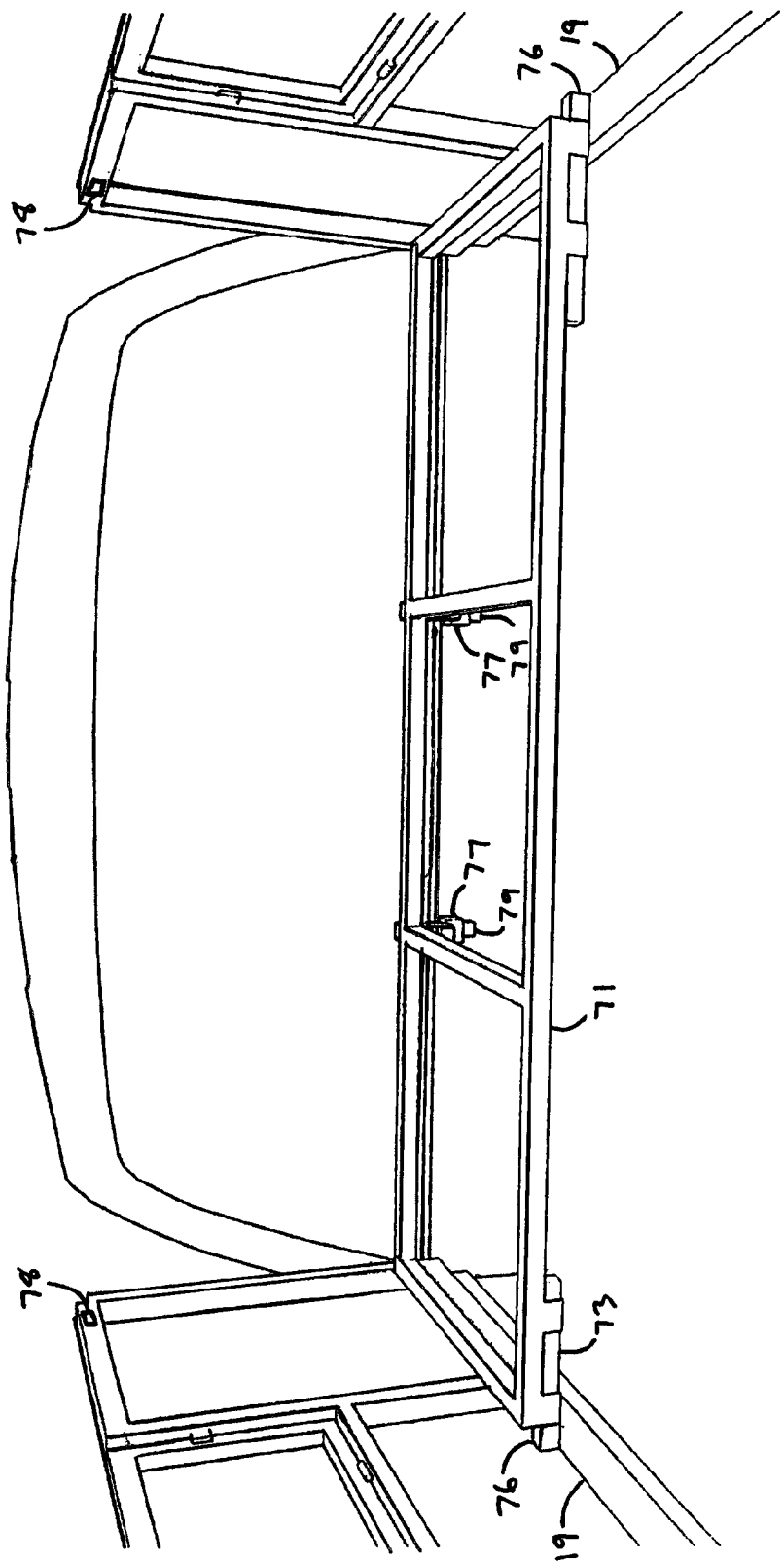
FIG. 7B is a rear right perspective view of the apparatus with the removable shelf in a shelf position.
Figure 7C:
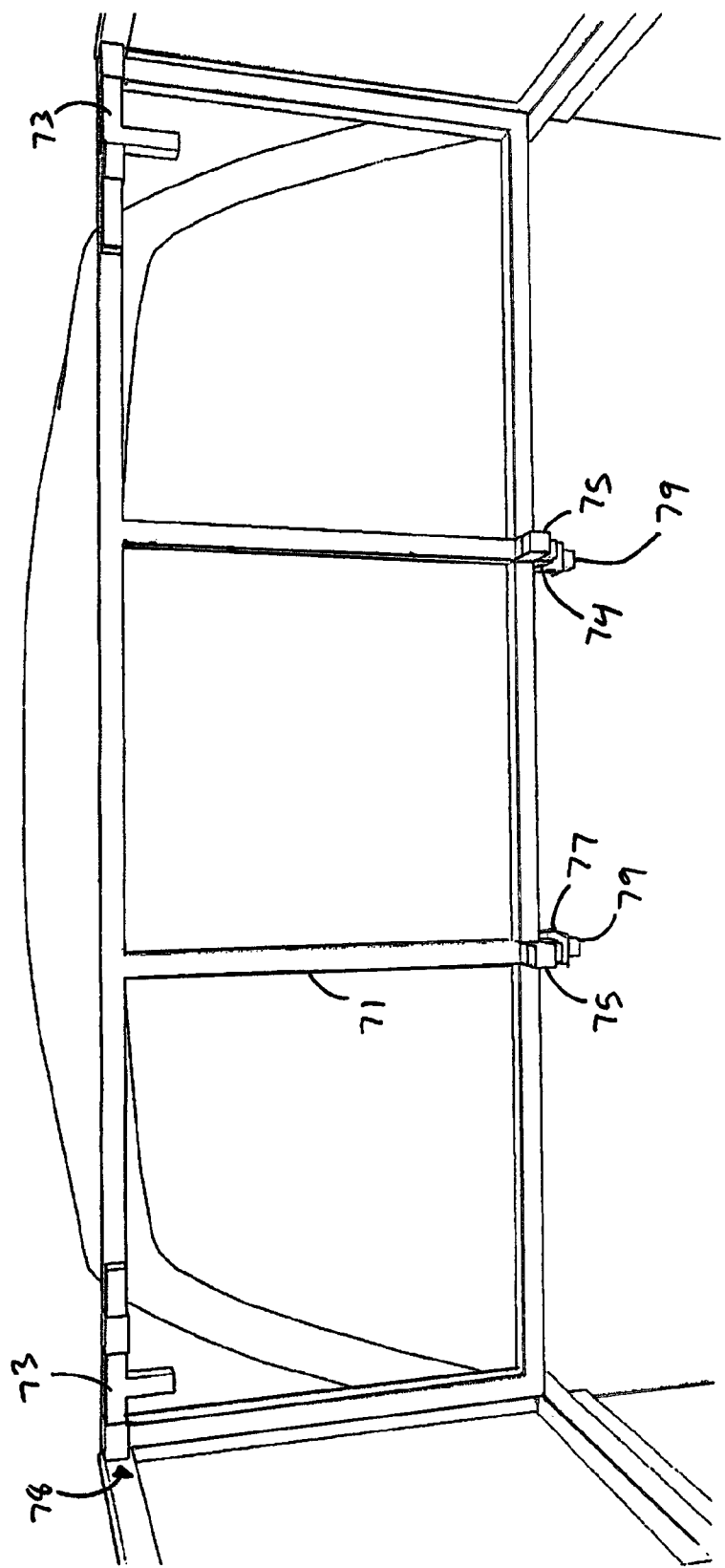
FIG. 7C is a rear right perspective view of the apparatus with the removable shelf in a window guard position.
Figure 7D:
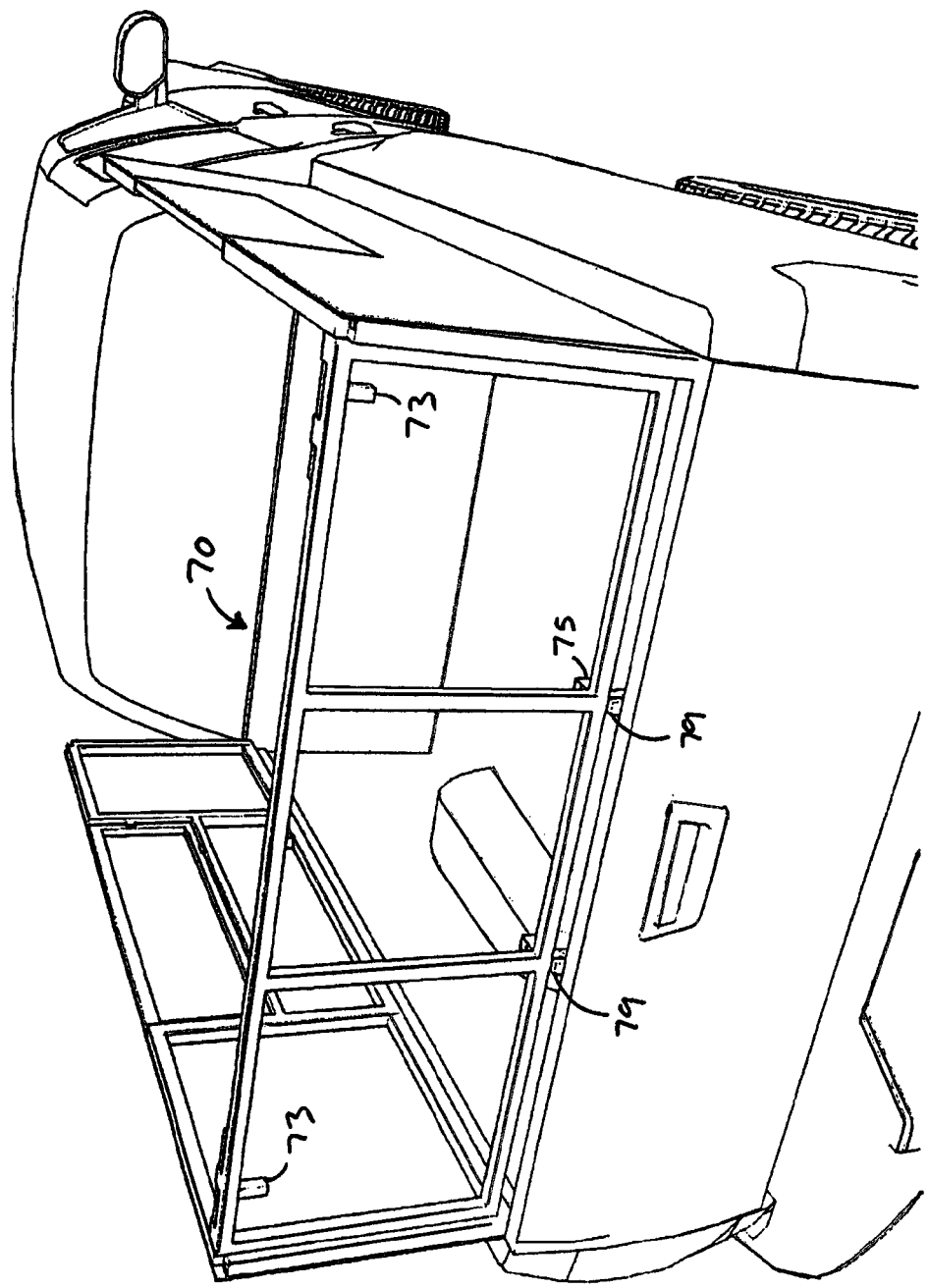
FIG. 7D is a rear right perspective view of the apparatus with the removable shelf in a fence position.

The shelf 70 may be configured for utilization in multiple positions. The shelf 70 is placed in a shelf, or horizontal, position as shown in FIG. 7B by inserting the L-brackets 79 into the mounts 77, placing the L-brackets 79 into the horizontal bracket rings 75, and extending the bolts 73 into the bolt rings 76 or pockets 78 that are aligned with the shelf frame 71 in the horizontal position. Referring to FIG. 7C, the shelf 70 may be mounted vertically, or perpendicular to the floor 7, adjacent to the front wall 3 and serving as a rear window guard on the truck, by placing the L-brackets 79 into the vertical bracket rings 74 and extending the bolts 73 into the bolt rings 76 or pockets 78 that are aligned with the shelf frame 71 in the vertical position. In this position, the shelf 70 may support the function of the crossbar 28. Further, in this configuration, the shelf 70 may be placed in the vertical position attached by the bolts 73 to the distal end of the assemblies 13, 14 to serve, essentially, as a fence across the back of the truck to hold articles in the bed. See FIG. 7D. Additional mounts 77 may be permanently or removably attached to the tailgate 6 to receive the L-brackets 79 in this position. A locking mechanism on any or all of the shelf 70, assemblies 13, 14, or tailgate 6 may allow the shelf 70 to further secure articles in the bed of the truck.

Figure 20:
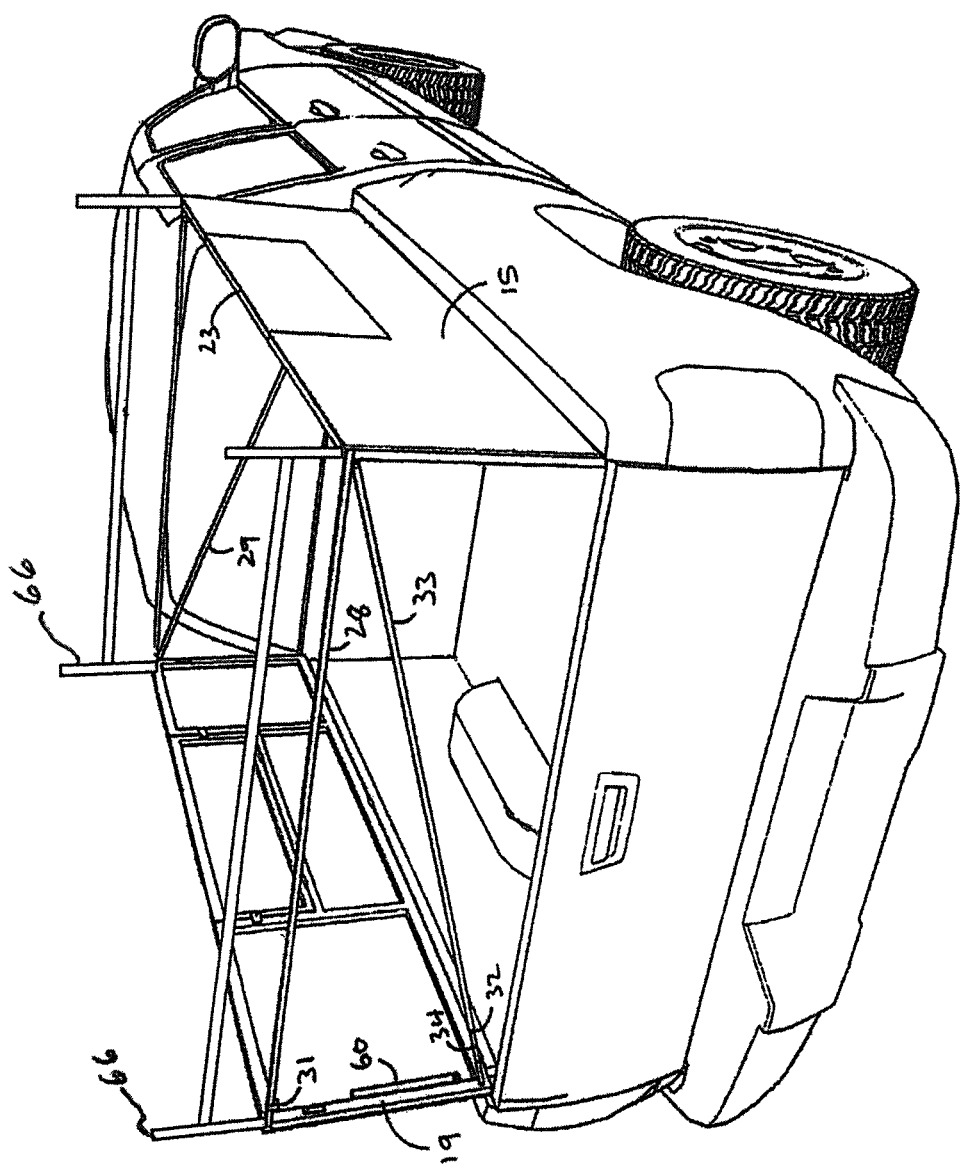
FIG. 20 is a rear right perspective view of the first embodiment of the present invention in the extended position illustrating the frame extensions used as a ladder rack.

In addition to the shelf, other structures may be attached to the cover for retaining equipment and accessories. For example, as shown in FIG. 20, an H-shaped extension 66 can be removably attached across the bed of the truck near the front, with another extension 66 removably attached across the bed of the truck near the back. The short leg of the extension 66 are fitted inside or over the frame 19 at the front and back of the bed. The ladder or other equipment can be attached with tie-downs or clips, as known in the art.

Figure 8:
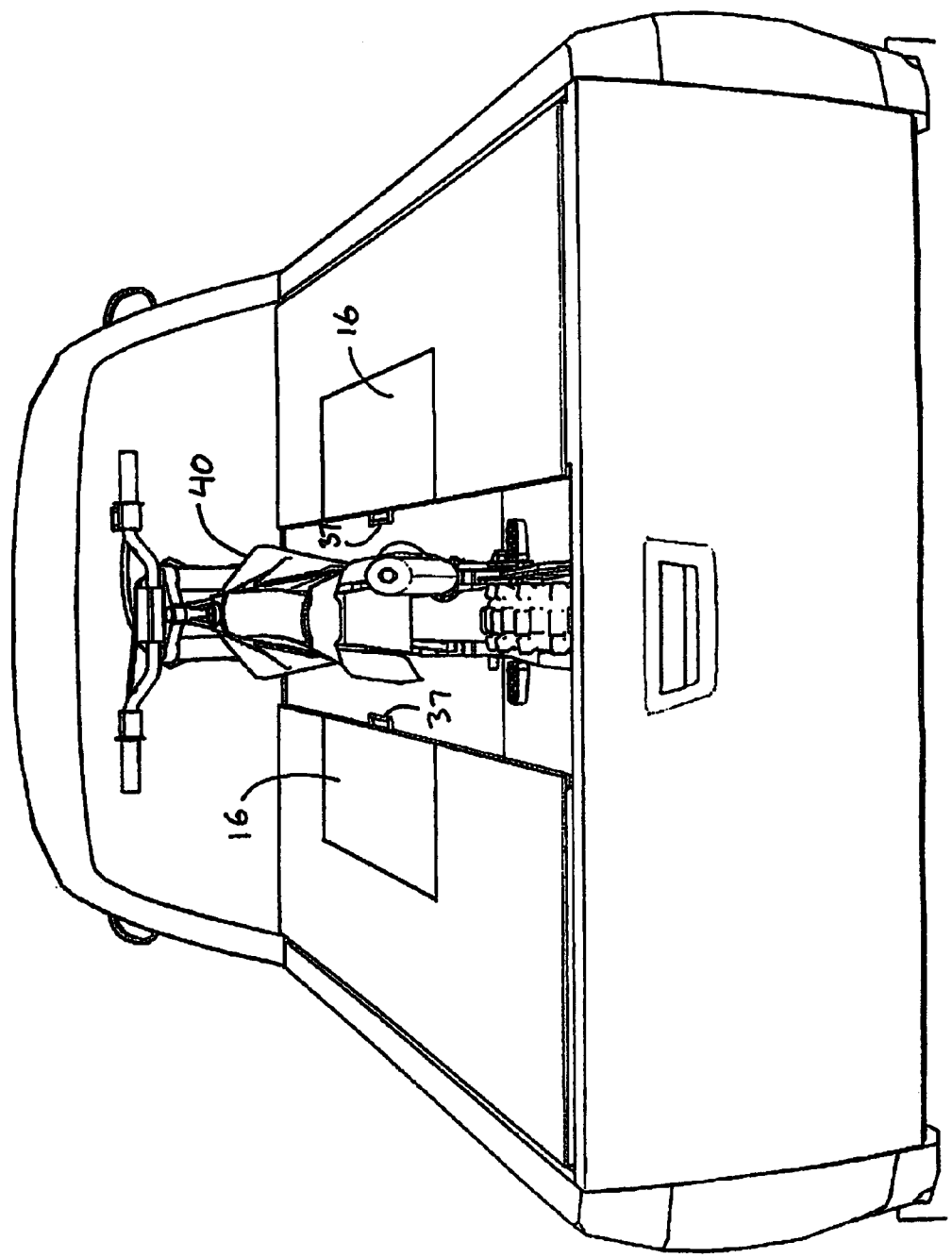
FIG. 8 is a rear perspective view of a second embodiment of the present invention in the horizontal position with a dirtbike stowed in the truck bed.
Figure 9:
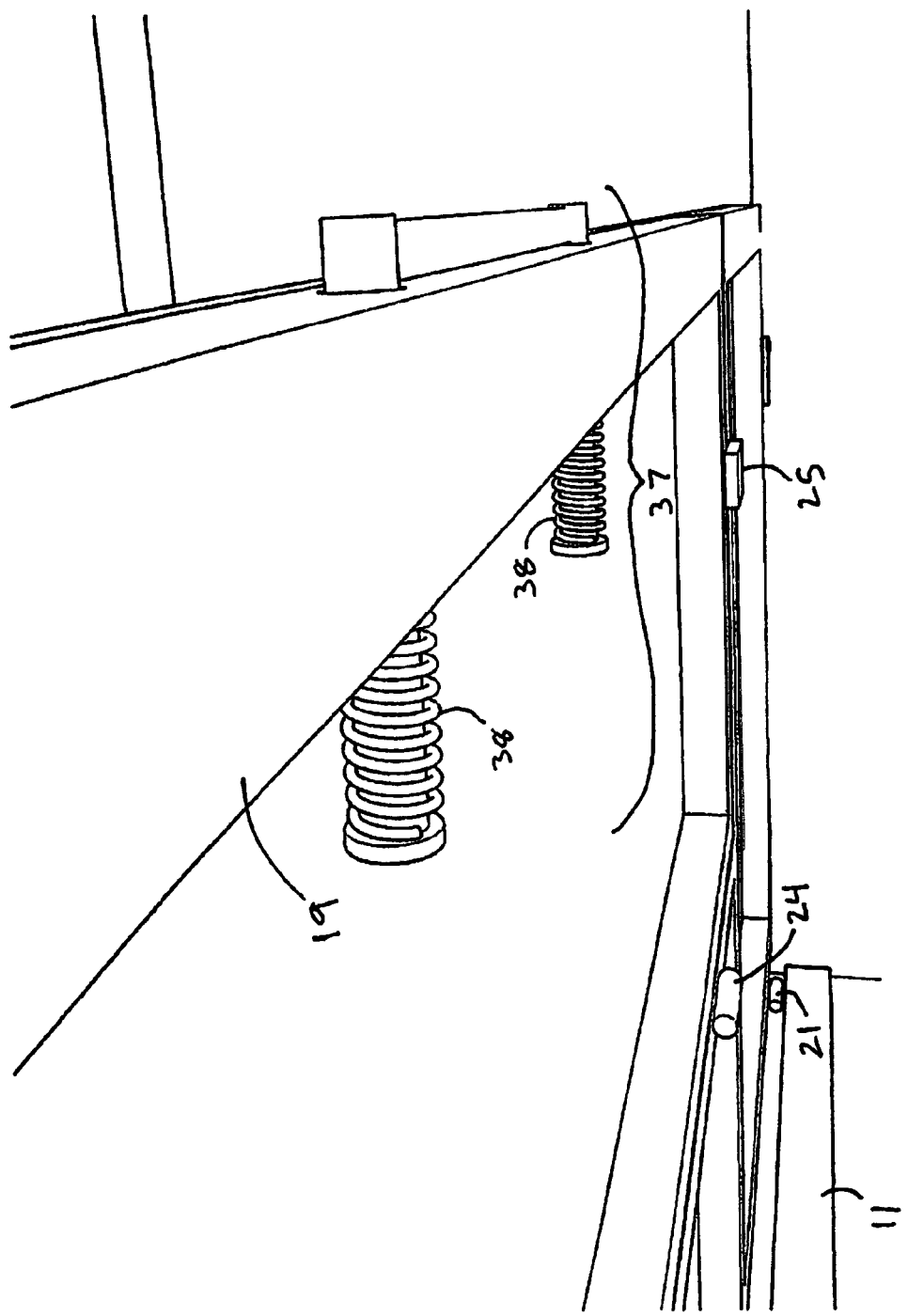
FIG. 9 is a perspective view of the underside of a panel assembly of FIG. 6 showing the vehicle anchor.

Referring to FIGS. 8 and 9, a dirtbike, motorcycle, or other vehicle 40 may be transported in the gap 35. One or more vehicle anchors 37 may be attached to the frame 19 of each assembly, and the vehicle 40 attached to the anchors 37 for vertical stability and, preferably, security purposes. That is, the vehicle 40 may be locked into the truck bed by attaching a locking device to the vehicle 40 and to one or more of the anchors 37, and the remainder of the cargo space may also be secured by locking the assemblies 13, 14 in the horizontal position. A vehicle anchor 37 is preferably attached to the frame 19 at about the midpoint, lengthwise, of the frame 19. The anchor 37 may be retractable. Preferably, the anchor 37 is a metal handle with ends disposed through the frame 19 and biased against the frame 19 by springs 38. See FIG. 9.

Figure 10:
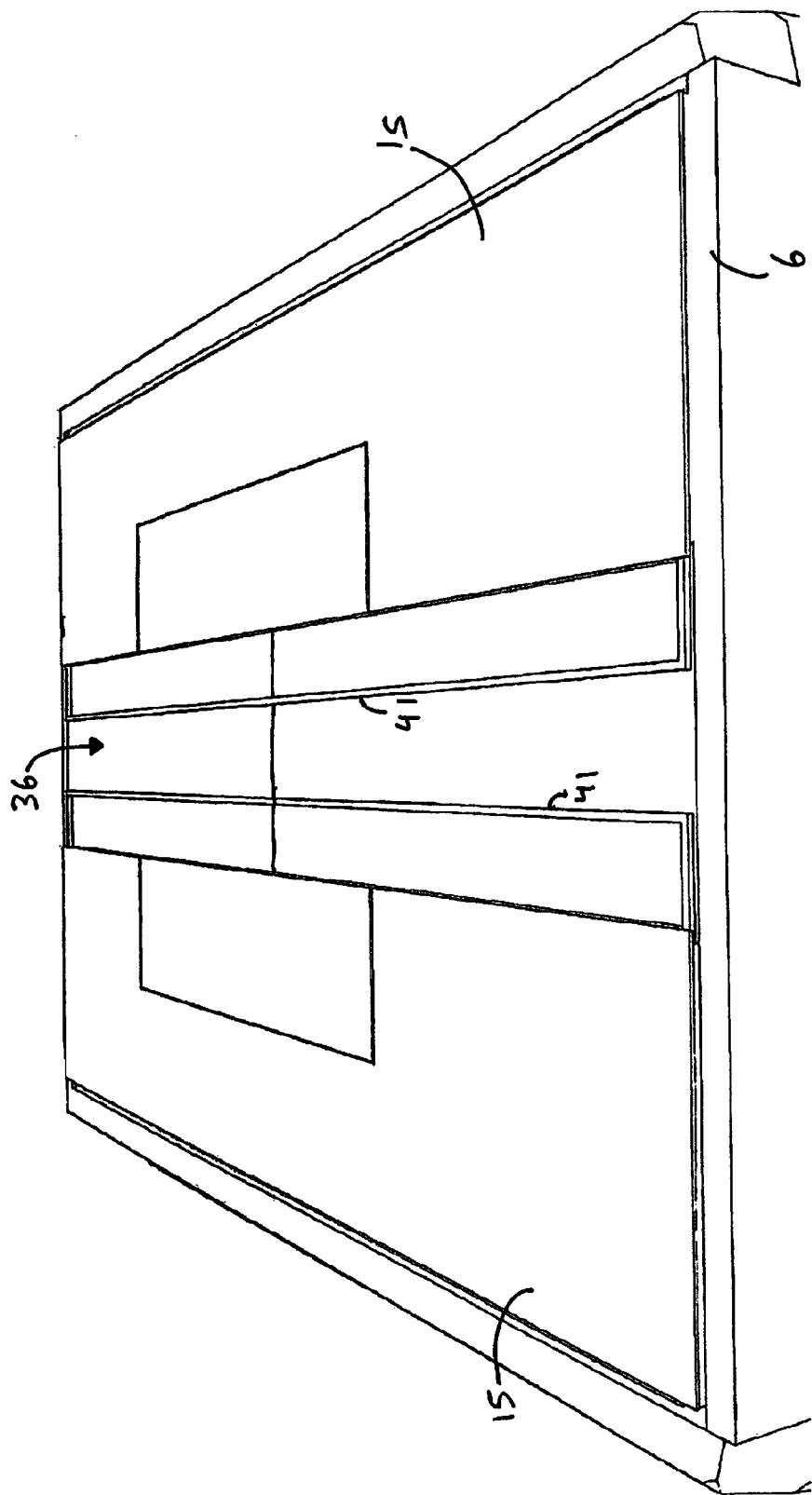
FIG. 10 is a rear perspective view of a third embodiment of the present invention in the horizontal position with security bars in place.
Figure 11:
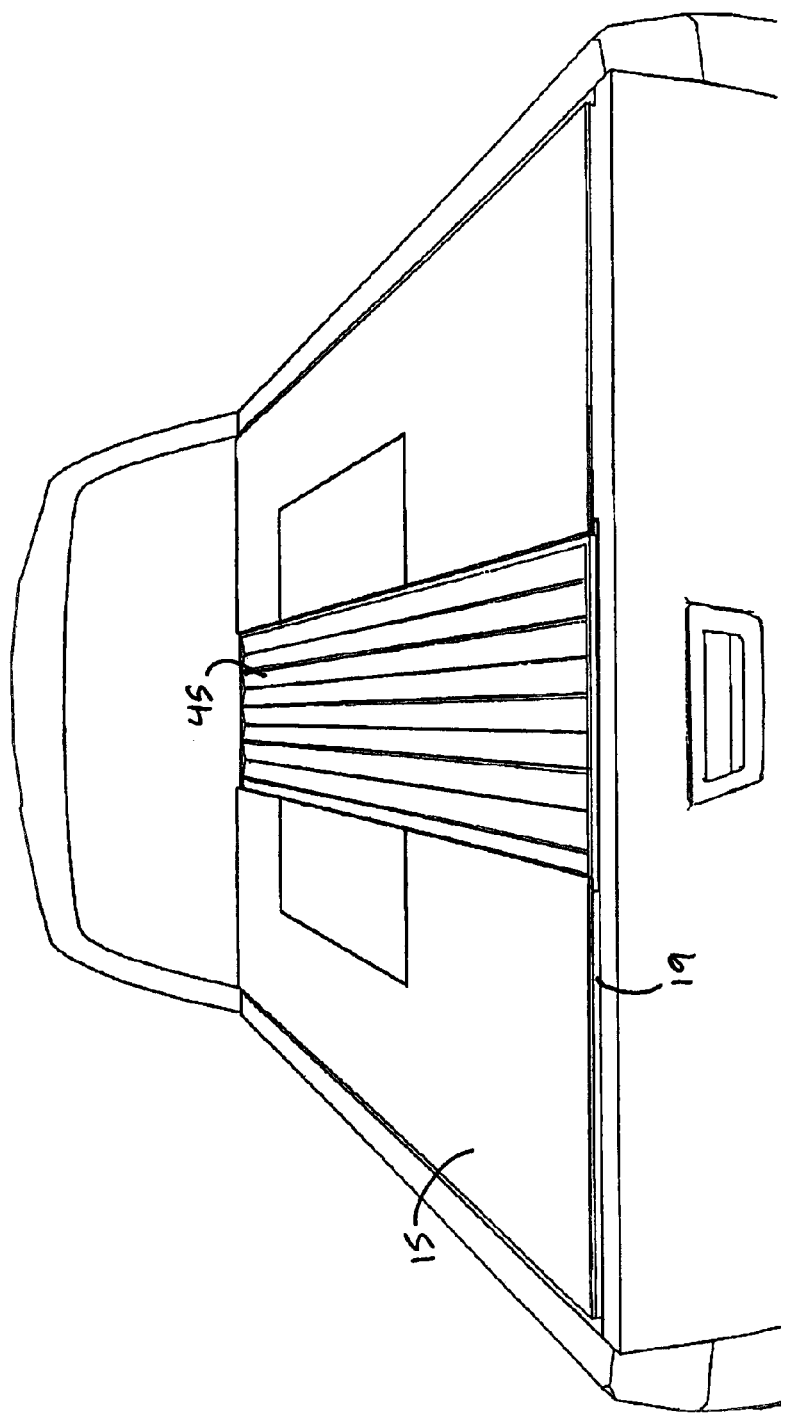
FIG. 11 is a rear perspective view of a fourth embodiment of the present invention in the horizontal position with an expanding panel.
Figure 12:
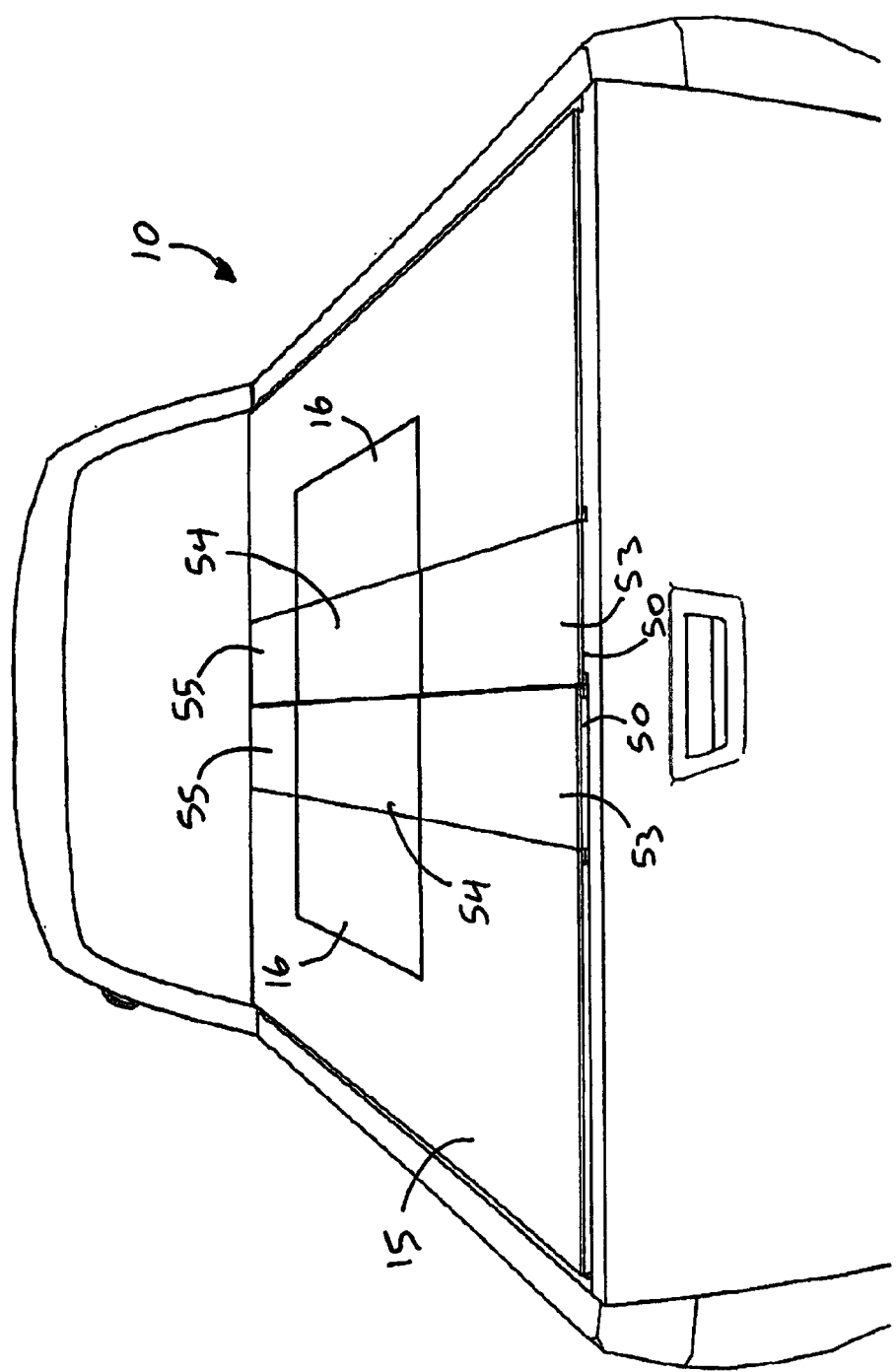
FIG. 12 is a rear perspective view of a fifth embodiment of the present invention in the horizontal position with a second layer of folding panels.

FIGS. 10-12 illustrate several embodiments of the apparatus 10 comprising structures for securing or eliminating the gap 36 created in the horizontal position. Referring to FIG. 10, one or more security bars 41 may be permanently or removably attached to one or more of the frames 19. Preferably, the security bar 41 fits into the holes used for the crossbars 28 but is disposed parallel to the frame 19 instead of perpendicular. The security bar 41 extends laterally from the frame 19 into the gap 36, dividing the open space into multiple smaller open spaces. Multiple security bars 41 cooperate to form a "cage" across the gap 26 through which the contents of the cargo area cannot be extracted. The security bar 41 may be slidably attached to the frame 19 so as to extend and retract to a desired position for use or storage. In this embodiment the frame 19 may comprise a channel (not shown) below each crossbar hole, the channels having a depth that prevents the security bar 41 from retracting too far and leaving the gap 36 open. In one embodiment, the crossbar 28 may be telescoping so that it may function as both a crossbar 28 and a security bar 41.

Referring to FIG. 11, at least one of the panel assemblies 13, 14 may comprise an expanding panel 45, preferably an accordion-style folding panel with self-stacking slats. The expanding panel 45 may be substantially rigid or may be supported by an underlying telescoping rigid brace (not shown). Alternatively, the expanding panel 45 may be attached to a security bar 41. The expanding panel 45 expands to cover some or all of the gap 36. Preferably, the expanding panel 45 is substantially waterproof and contacts one or more gaskets (not shown) on the frames 19 to complete a substantially weather-tight cover over the cargo area. A single expanding panel 45 attached to the frame 19 of the left panel assembly 13 is illustrated. Alternatively, expanding panels 45 on each frame 19 may meet substantially in the middle of the gap and attach to each other.

At least one of the panel assemblies 13, 14 may comprise additional frame subsections and attached subpanels that fold out to fill the gap 36. As illustrated, both panel assemblies 13, 14 comprise this second layer of panels for the sake of panel symmetry when the panel assemblies 13, 14 are placed in the extended vertical position. In this embodiment, each frame 19 comprises a first rear subsection attached by frame hinges 24 to the rear part of the main section 22, a second middle subsection attached by frame hinges 24 to the first middle subsection 23, and a first front subsection attached by frame hinges 24 to front part of the main section 22. As shown in FIG. 12, each panel assembly 13, 14 further comprises a first rear subpanel 53 attached to the first rear subsection 50, a second middle subpanel 54 attached to the second middle subsection, and a first front subpanel 55 attached to the first front subsection. Preferably, this second layer of panels meets in the middle of the gap 36 as shown. The second layer of panels may fold under the first layer of panels when the panel assemblies 13, 14 are placed in the first, folded-away position. In this embodiment, the panel assemblies 13, 14 project about 2.25 inches from their respective walls 4, 5 into the cargo space. The base beams 11, 12 may be wider in this embodiment, or may otherwise be set further away from the walls 4, 5, to accommodate the folding-under of the second layer of panels.

Figure 13:
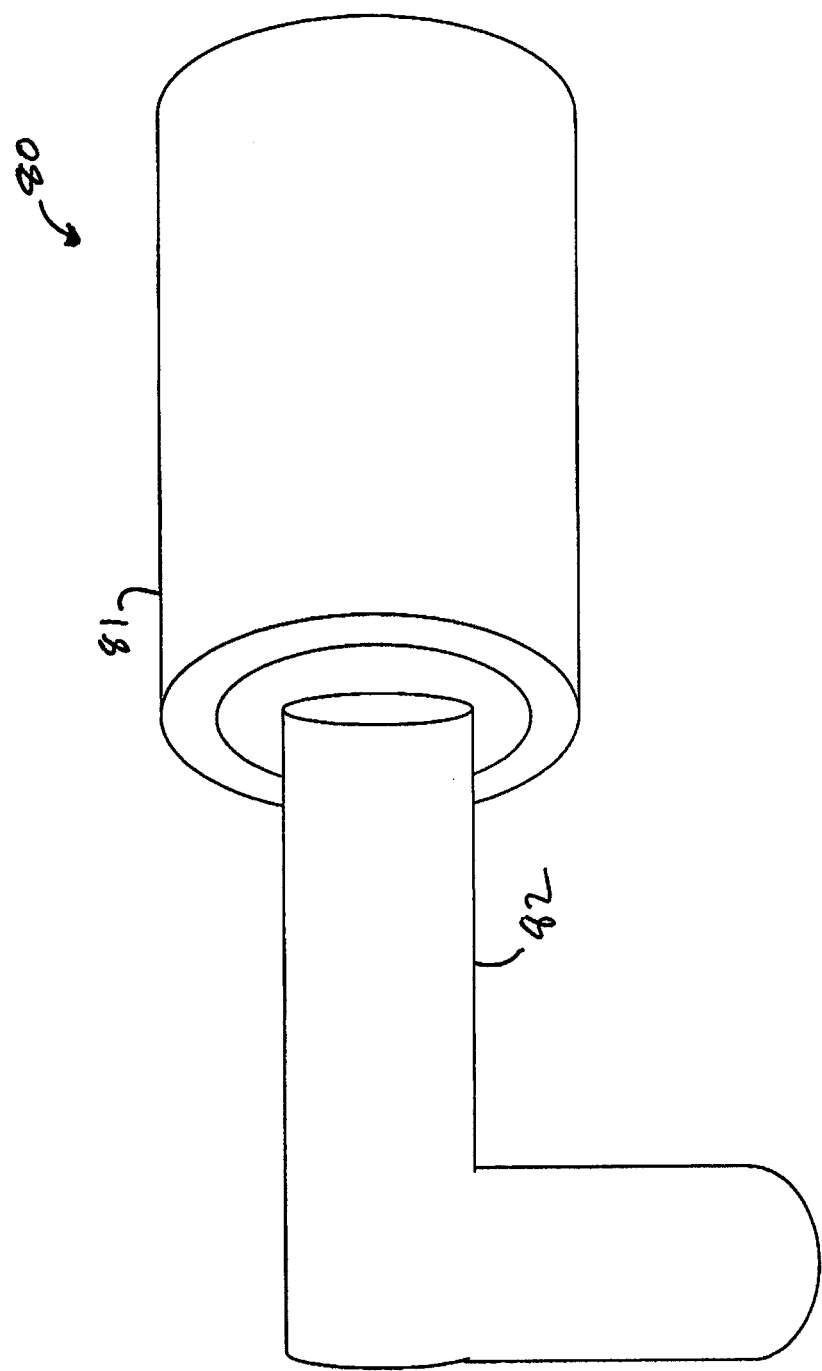
FIG. 13 is a top perspective view of the preferred hinging mechanism of the invention.

While any conventional hinge may be used for the hinges of the invention, FIG. 13 illustrates a preferred hook hinge 80 that modularizes the panels of the panel assemblies 13, 14, allowing each subpanel attached by a hook hinge 80 to be individually removed. The hook hinge 80 comprises a hollow, cylindrical receiver 81 and a mated round hook 82. The receiver 81 is permanently attached to a base beam 11, 12 or part of a frame 19, and the round hook 82 is attached to the opposite part to be hinged, so that the hook 82 extends outward from the part and then turns 90 degrees, parallel to the part. In operation, the round hook 82 is inserted into the receiver 81, so that the parts are removably attached and properly aligned.

Referring to FIGS. 14-18, the support assemblies 27 may be configured to fold away against the panel assemblies 14, 15 for storage in the retracted position, instead of being removed and stowed below the base beams 11, 12 as previously described. In this embodiment, the support assemblies 27 comprise a plurality of support hinges 85 attached to the frames 19. The support hinges 85 may be configured in the manner of the hook hinge 80 or as a standard pin hinge. The support assembly 27 at the rear of the vehicle may include a sleeved crossbar comprising a first crossbar portion 90 permanently or removably attached to a hinge 85 near the top of the left panel assembly 13, a second crossbar portion 91 permanently or removably attached to a hinge 85 near the top of the right panel assembly 14, and a sleeve 92 slidably attached to the first or second crossbar portion 90, 91. The crossbar sections 90, 91 preferably have a length that allows them to be stowed inside the perimeter of each frame 19 as described below. As a result, there may be a gap between the crossbar sections 90, 91 when the panel assemblies 13, 14 are in the vertical position. See FIG. 14. To secure the panel assemblies 13, 14 in the vertical position, the sleeve 92 is slid over the ends of the crossbar sections 90, 91, spanning the gap. Preferably, the sleeve 92 is stored in a retracted position using a removable pin that passes through the sleeve 92 and the second crossbar section 91. Also preferably, the same removable pin may be used to secure the sleeve 92 in an extended position, attached to the second crossbar section 91 and extending over the end of the first crossbar section 90. A second removable pin may be used to secure the sleeve 92 to the first crossbar section 90 in the extended position.

Figure 16:
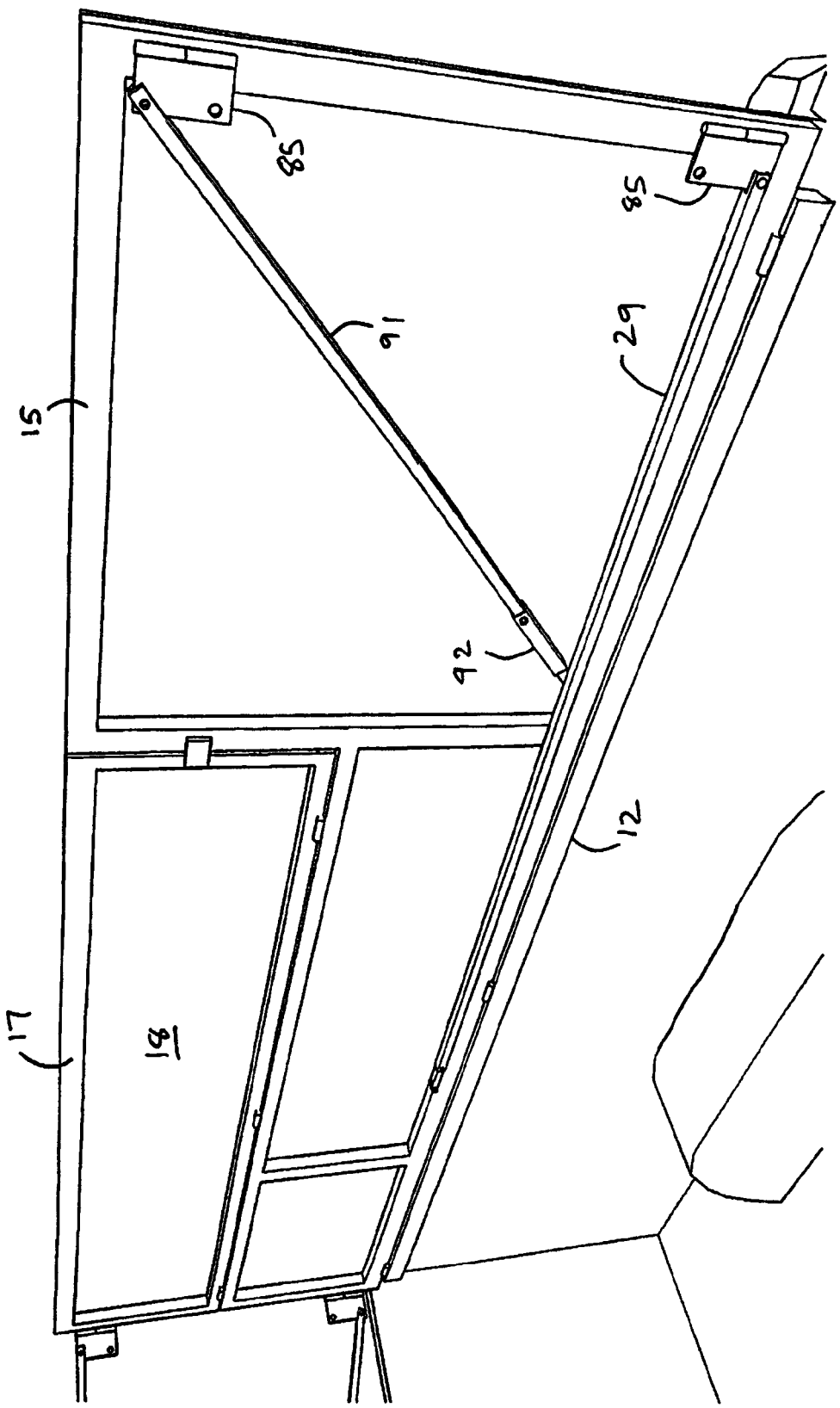
FIG. 16 is a left perspective view of the embodiment of FIG. 14 with the support assembly in the retracted position.
Figure 18:
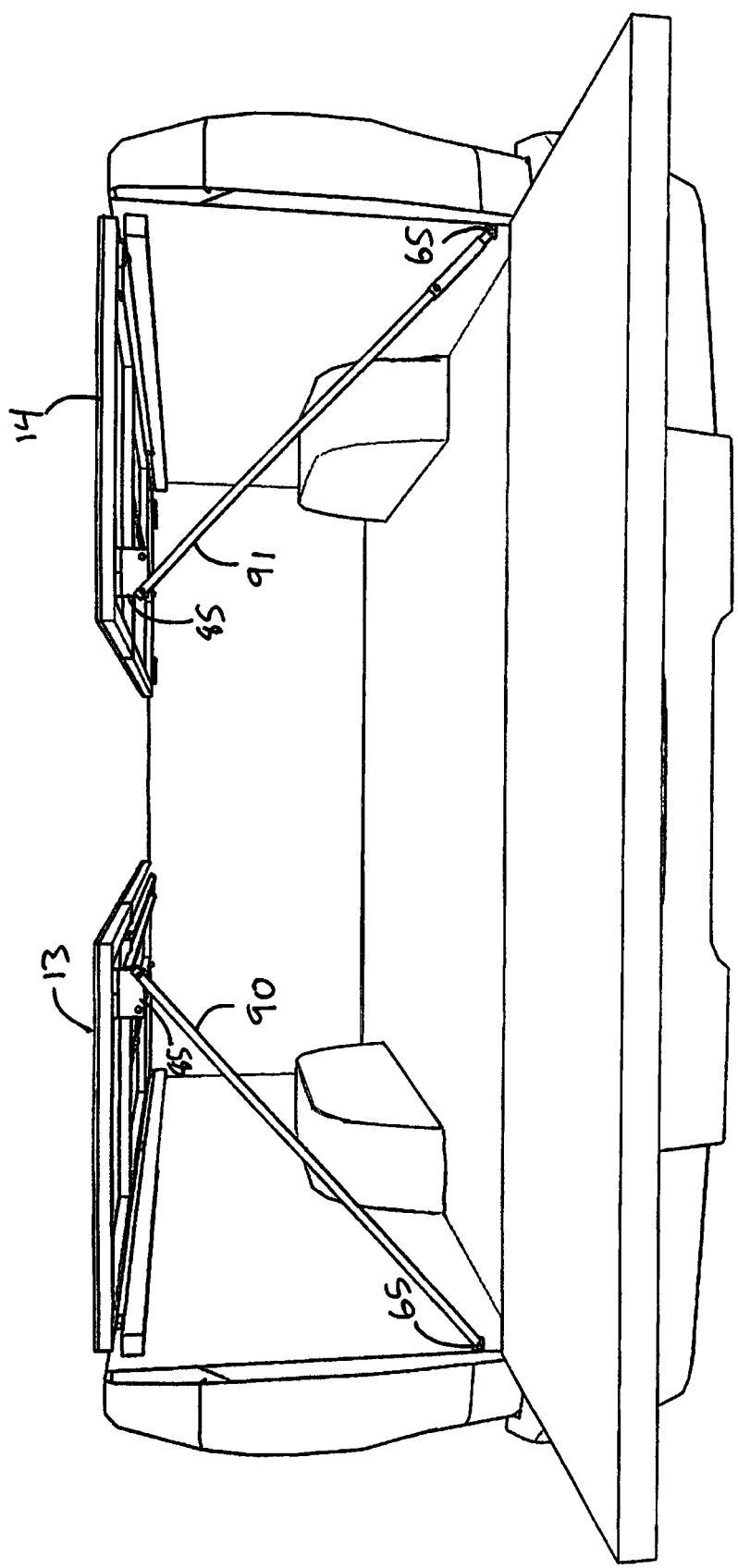
FIG. 18 is a rear perspective view of the embodiment of FIG. 14 with the device in the horizontal position.

The support assembly 27 at the rear of the vehicle may further comprise a support pole 29, which is preferably telescoping as described above. Preferably, the support pole 29 is attached to a hinge 85 at the bottom of the right panel assembly 14. The support assembly 27 at the rear of the vehicle is stowed by retracting the sleeve 92 and support pole 29 and swinging the second crossbar section 91 and support pole 29 inward around the hinges 85. The second crossbar section 91 fits inside the frame 19 and is secured in place by the support pole 29 as shown in FIG. 16. The support pole 29 may be fastened in the position of FIG. 16 using a clip or other fastener, or it may be held in place by gravity when the right panel assembly 14 is folded down. This embodiment of the support assembly 27 may be preferred to other described embodiments because the support assemblies 27 do not have to be disassembled and stowed, thus taking less space and less time to extend and retract. Furthermore, as shown in FIG. 18, the first and second crossbar sections 90, 91 may serve the function of the braces 60. Specifically, each crossbar section 90, 91 may be attached between a hinge 85 and an anchor 65 to support the device 10 in the horizontal position. Separate braces 60 are therefore not required.

Figure 14:
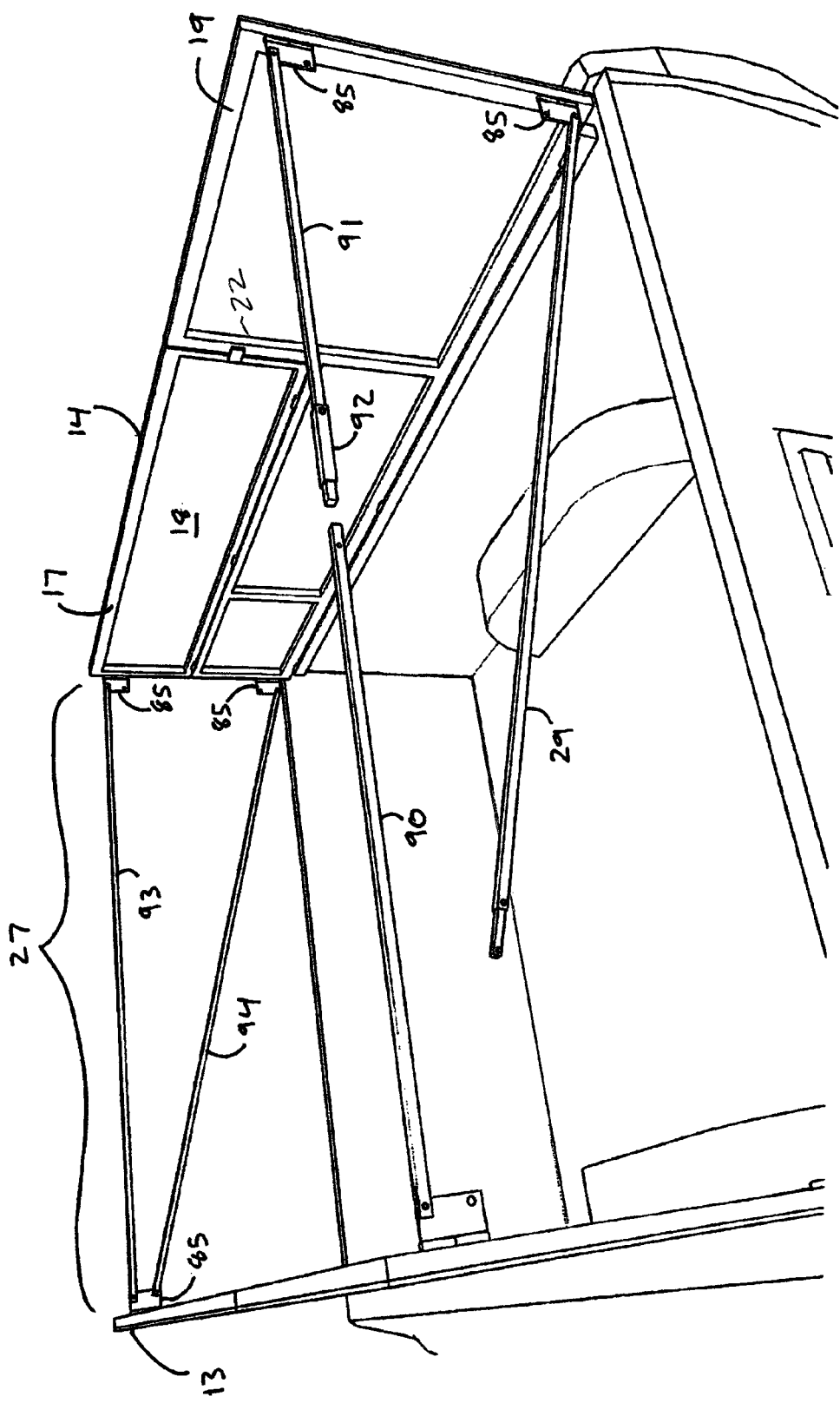
FIG. 14 is a top rear left perspective view of an alternative embodiment of a support assembly, showing the sleeve in the retracted position.
Figure 15:
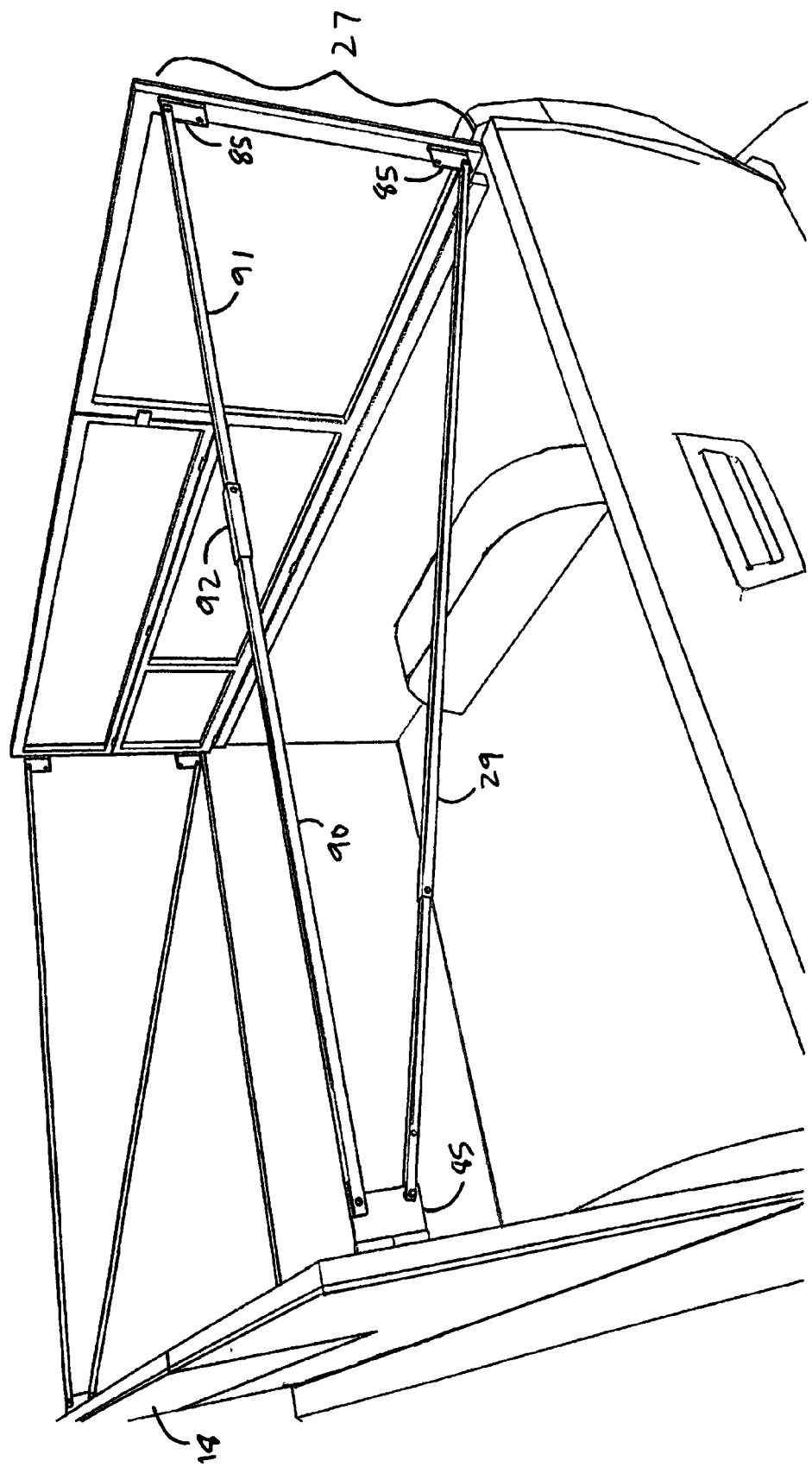
FIG. 15 is a top rear left perspective view of the embodiment of FIG. 14, showing the sleeve in the extended position.
Figure 17A:
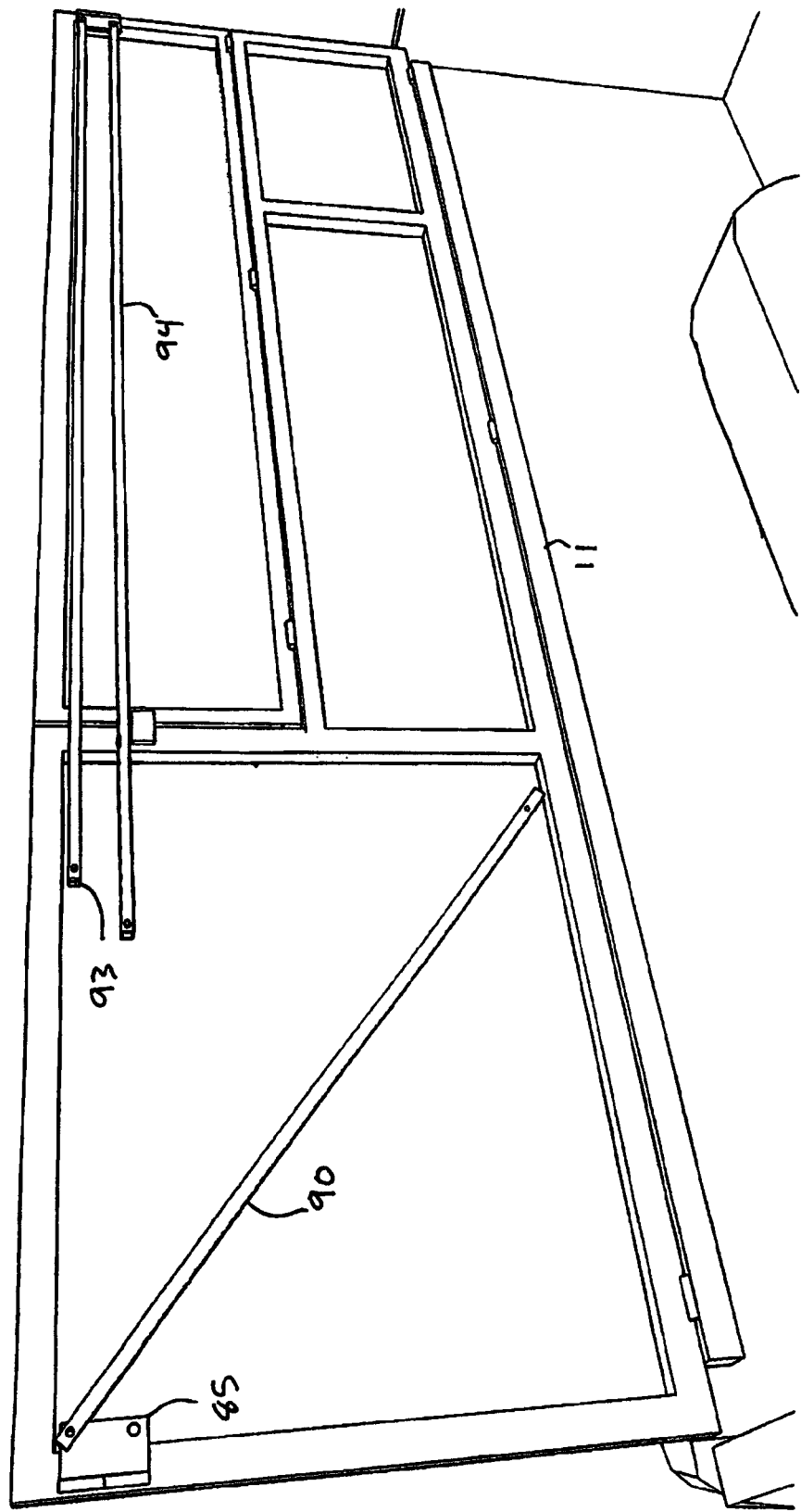
FIG. 17A is a right perspective view of the embodiment of FIG. 14 with the support assembly in the retracted position and the forward section extended.
Figure 17B:
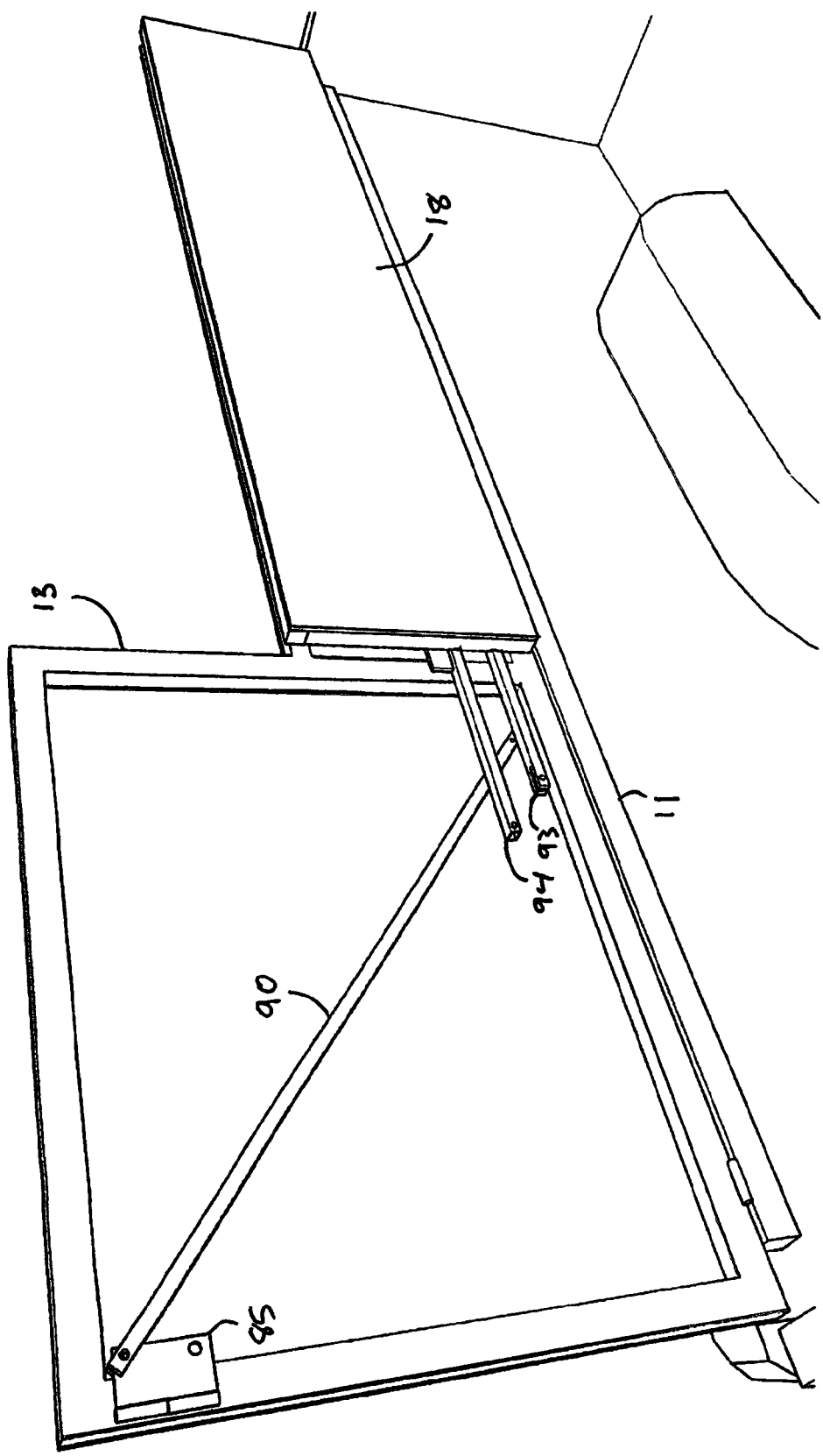
FIG. 17B is a right perspective view of the embodiment of FIG. 14 with the support assembly in the retracted position and the forward section folded down.

The support assembly 27 at the front of the vehicle bed may have the same components as any support assembly previously described or, as illustrated in FIGS. 14, 17A and 17B, it may comprise a solid crossbar 93 removably attached to hinges 85 at the top of the panel assemblies 13, 14, and a solid support pole 94 removably attached to the hinge 85 at the top of the left panel assembly 13 and a hinge 85 at the bottom of the right panel assembly 14. To stow this support assembly 27, the solid crossbar 93 and solid support pole 94 are detached from the hinges 85 on the right panel assembly 14 and folded inward toward the frame 19. See FIG. 17A. In the illustrated embodiment, the forward section 17 is folded down with the solid crossbar 93 and solid support pole 94 inside, positioned to retain the first crossbar section 90 in place in the frame 19. See FIG. 17B.

Figure 19:
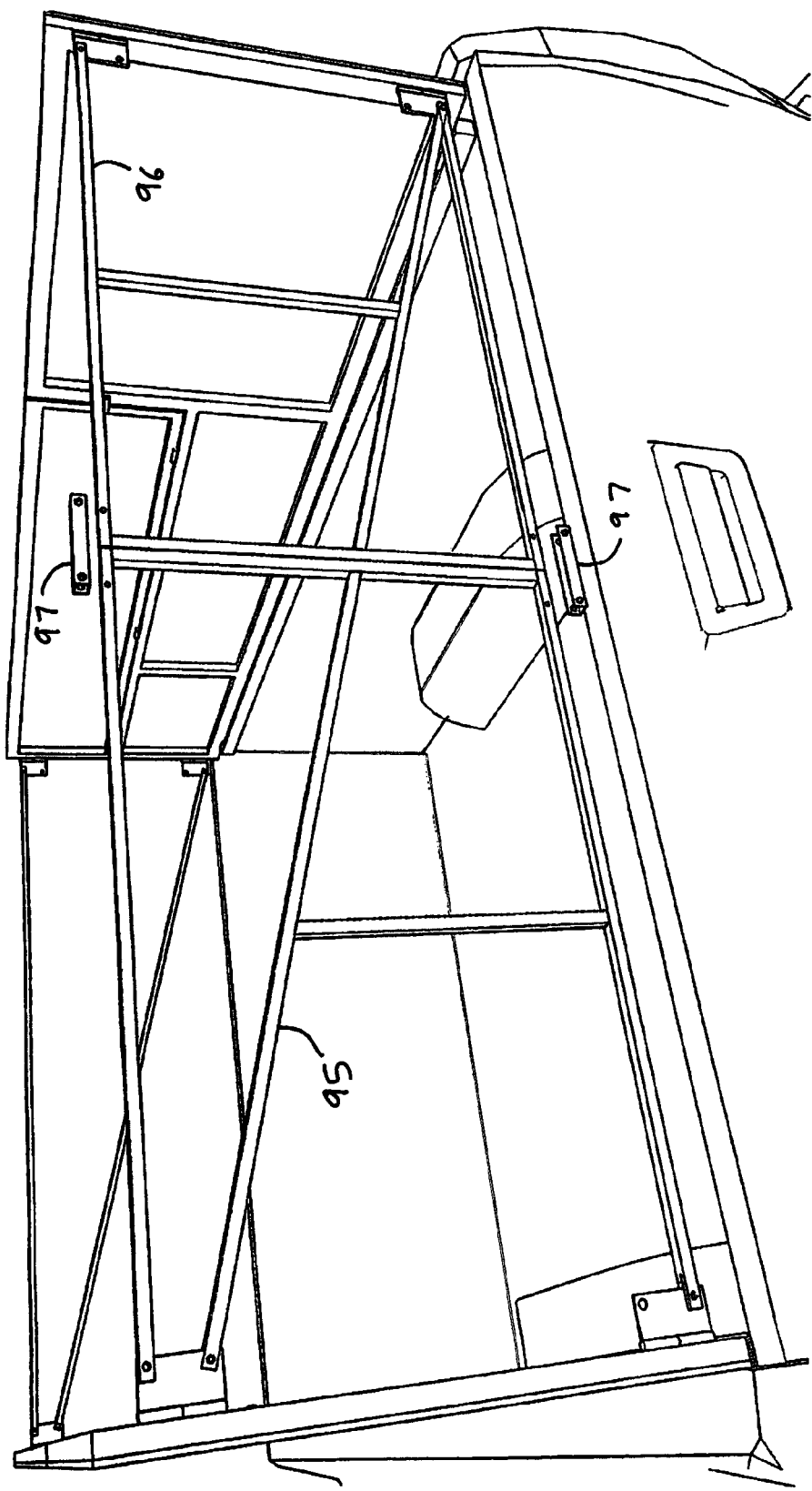
FIG. 19 is a top rear left perspective view of a rear gate in accordance with the invention.

Referring to FIG. 19, in another embodiment the support assembly 27 may comprise a left gate 95 and a right gate 96 that attach to hinges 85 as described above and attach to each other with one or more removable sleeves 97. Each gate 95, 96 may comprise an arrangement of rigid bars configured to prevent or allow access to the bed of the truck, and to prevent articles from falling out of the bed, as needed. Each sleeve 97 may be configured to fasten in place using any conventional fastening mechanism.

While there has been illustrated and described what is at present considered to be the preferred embodiment of the present invention, it will be understood by those skilled in the art that various changes and modifications may be made and equivalents may be substituted for elements thereof without departing from the true scope of the invention. Therefore, it is intended that this invention not be limited to the particular embodiment disclosed, but that the invention will include all embodiments falling within the scope of the appended claims.

The invention claimed is:

1. A cover for a truck bed having a left wall, a right wall, and a floor, the cover comprising:
   a) a left frame that is movable through and retainable in a stowed position within the truck bed, a horizontal position, and an extended position above the truck bed;
   b) a right frame that is movable through and retainable in the stowed position within the truck bed, the horizontal position, and the extended position above the truck bed;
   c) wherein the left and right frames are shaped to leave an opening between the frames when in the horizontal position, the shape configured to permit an object in the truck bed to extend above the left and right frames.

2. The cover of claim 1 wherein the opening is sized to accommodate a wheel well of the truck such that the wheel well protrudes through the frame when the frame is in the stowed position.

3. The cover of claim 1 wherein the opening is sized to accommodate the gooseneck of a trailer.

4. The cover of claim 1 further comprising a tent attached to the left and right frames.

5. A cover for a truck bed having a left wall, a right wall, and a floor, the cover comprising:
   a) a left panel assembly that is movable through and retainable in a stowed position within the truck bed, a horizontal position, and an extended position above the truck bed, wherein:
      i. the stowed position is substantially vertical and parallel to the left wall;
      ii. the horizontal position is substantially parallel to the floor; and
      iii. the extended position is substantially vertical and parallel to the left wall;
      and
   b) a right panel assembly that is movable through and retainable in the stowed position within the truck bed, the horizontal position, and the extended position above the truck bed, wherein
      i. the stowed position is substantially vertical and parallel to the right wall;
      ii. the horizontal position is substantially parallel to the floor; and
      iii. the extended position is substantially vertical and parallel to the right wall;
      wherein the right panel assembly and left panel assembly do not engage each other when in the horizontal position; and wherein
   the left and right panel assembles each comprise:
      i. a frame; and
      ii. a panel attached to each section of the frame.

6. The cover of claim 5 further comprising a frame subsection attached to the frame, wherein left and right panel assemblies cooperate to cover the entire bed when the cover is in the horizontal position.

7. The cover of claim 5 further comprising one or more braces configured to secure the panel assemblies in the horizontal position.

8. The cover of claim 7 wherein each brace is rotatably attached at its first end to the frame such that the brace can be moved from a position parallel to the frame to a diagonal position between the frame and the wall and its other end attached to an anchor attached to the wall, thereby supporting the panel assembly in a horizontal position.

9. The cover of claim 7 further comprising one or more support assemblies configured to secure the panel assemblies in the extended position.

10. The cover of claim 9 wherein each support assembly comprises:
    a) a horizontal cross bar, wherein the cross bar is attached at its first end to the left panel assembly and is attached at its other end to the right panel assembly in a position substantially parallel to the floor; and
    b) a diagonal brace, wherein the diagonal brace is attached at its first end to the left panel assembly and is attached at its other end to the right panel assembly in a diagonal position between the left and right assemblies.

11. The cover of claim 10 wherein the diagonal brace is a telescoping support pole, rotatably attached at its first end to the cross bar and removably attached to the cross bar at its other end such that the support pole can be removed from a position parallel to the cross bar and telescoped to a diagonal position between the left and right assemblies.

12. The cover of claim 5 wherein the frame is divided into a main section and a midsection, wherein the midsection is rotatably connected to the main section such that the midsection can be retracted into a position than enables the panel assembly to remain substantially vertical when in the stowed position.

13. The cover of claim 12 wherein, when the panel assembly is in the horizontal position, the midsection is sized to accommodate cargo that while in the truck bed stands taller than the walls.

14. The cover of claim 12 wherein the midsection may be fastened in the retracted position while the panel assembly is in the horizontal position thereby forming an opening in the cover when the panel assembly is in the horizontal position to accommodate access to an object in the truck bed.

15. The cover of claim 12 wherein the midsection is sized to accommodate a wheel well of the truck such that the wheel well protrudes through the midsection when the panel assembly is in the stowed position.

16. The cover of claim 15 wherein the midsection may be fastened in the retracted position while the panel assembly is in the horizontal position thereby forming an opening in the cover when the panel assembly is in the horizontal position to accommodate access to an object in the truck bed.

17. A cover for a truck bed having a left wall, a right wall, and a floor, the cover comprising:
a) a left panel assembly that is movable through and retainable in a stowed position within the truck bed, a horizontal position, and an extended position above the truck bed, wherein:
   i. the stowed position is substantially vertical and parallel to the left wall;
   ii. the horizontal position is substantially parallel to the floor; and
   iii. the extended position is substantially vertical and parallel to the left wall;
   and
b) a right panel assembly that is movable through and retainable in the stowed position within the truck bed, the horizontal position, and the extended position above the truck bed, wherein
   i. the stowed position is substantially vertical and parallel to the right wall;
   ii. the horizontal position is substantially parallel to the floor; and
   iii. the extended position is substantially vertical and parallel to the right wall;
   wherein the right panel assembly and left panel assembly do not engage each other when in the horizontal position; and
c) a left base beam attached to the left wall and a right base beam attached to the right wall wherein:
   i. the left panel assembly is hingedly attached to the left base beam and may be rotated from the stowed position, to the horizontal position, and to the extended position; and
   ii. the right panel assembly is hingedly attached to the right base beam and may be rotated from the stowed position, to the horizontal position, and to the extended position.

* * * * *